US012766482B2

(12) United States Patent

Tsang et al.

(10) Patent No.: US 12,766,482 B2

(45) Date of Patent: Oct. 20, 2026

(54) SMALL MODULAR NUCLEAR REACTOR INTEGRATED ENERGY SYSTEMS FOR ENERGY PRODUCTION AND GREEN INDUSTRIAL APPLICATIONS

(71) Applicant: NuScale Power, LLC, Portland, OR (US)

(72) Inventors: Francis Tsang, Bellingham, WA (US); José N. Reyes, Jr., Corvallis, OR (US)

(73) Assignee: NuScale Power, LLC, Corvallis, OR (US)

(*) Notice: Subject to any disclaimer, the term of this patent is extended or adjusted under 35 U.S.C. 154(b) by 707 days.

(21) Appl. No.: 18/116,819

(22) Filed: Mar. 2, 2023

(65) Prior Publication Data

US 2023/0287583 A1 Sep. 14, 2023

Related U.S. Application Data

(60) Provisional application No. 63/316,959, filed on Mar. 4, 2022.

(51) Int. Cl.

*B01J 19/24* (2006.01)
*B01D 53/62* (2006.01)

(Continued)

(52) U.S. Cl.

CPC ............ *B01J 19/245* (2013.01); *B01D 53/62* (2013.01); *B01J 19/0006* (2013.01); *C01C 1/02* (2013.01);

(Continued)

(58) Field of Classification Search

CPC .................. B01J 19/245; B01J 19/0006; B01J 2219/00045; C01C 1/02; C01C 1/0405;

(Continued)

(56) References Cited

U.S. PATENT DOCUMENTS

| | | | |
|---|---|---|---|
| 2006/0013761 | A1 | 1/2006 | Lahoda |
| 2007/0181301 | A1 | 8/2007 | Thomas et al. |

(Continued)

FOREIGN PATENT DOCUMENTS

| | | | |
|---|---|---|---|
| CN | 107017634 | A | 8/2017 |
| WO | WO2023/167768 | A2 | 9/2023 |
| WO | WO2024/063805 | A2 | 3/2024 |

OTHER PUBLICATIONS

ISA, International Search Report and Written Opinion mailed Jul. 31, 2023 in International Patent Application No. PCT/US23/12156, 16 pages.

(Continued)

*Primary Examiner* — Lessanework Seifu

(74) *Attorney, Agent, or Firm* — Lee & Hayes, P.C.

(57) ABSTRACT

Integrated energy systems, such as for use in green industrial processes that produce few or no carbon emissions, and associated devices and methods are described herein. A representative integrated energy system can include a power plant system having multiple modular nuclear reactors. The nuclear reactors can generate steam for direct industrial use or for use in an electrical power conversion system to generate electricity. Individual ones of the nuclear reactors can be configured to flexibly generate differing outputs of steam or electricity based on the vary requirements of the industrial processes of the integrated energy system. The industrial processes can include, for example, the production of hydrogen, oxygen, nitrogen, ammonia, urea, sulfur, sulfuric acid, and/or other useful chemicals.

20 Claims, 21 Drawing Sheets

(51) Int. Cl.

| | |
|---|---|
| ***B01J 19/00*** | (2006.01) |
| ***C01C 1/02*** | (2006.01) |
| ***C10L 3/10*** | (2006.01) |
| ***C25B 1/042*** | (2021.01) |
| ***C25B 9/65*** | (2021.01) |
| ***C25B 9/67*** | (2021.01) |
| ***C25B 9/70*** | (2021.01) |
| ***C25B 15/08*** | (2006.01) |
| ***F22G 1/16*** | (2006.01) |
| ***G21D 9/00*** | (2006.01) |

(52) U.S. Cl.
CPC .............. *C10L 3/103* (2013.01); *C25B 1/042* (2021.01); *C25B 9/65* (2021.01); *C25B 9/67* (2021.01); *C25B 9/70* (2021.01); *C25B 15/081* (2021.01); *F22G 1/165* (2013.01); *G21D 9/00* (2013.01); *B01D 2257/504* (2013.01); *B01D 2258/06* (2013.01); *B01J 2219/00045* (2013.01); *Y02E 30/00* (2013.01); *Y02E 50/00* (2013.01)

(58) Field of Classification Search
CPC ........... Y02E 30/00; Y02E 60/36; C25B 9/65; C25B 9/67; C25B 9/70; C25B 15/00; C25B 15/08; C25B 1/04; B01D 53/62; B01D 2256/245; B01D 2257/03; C10L 3/103; C10L 2290/562; G21D 9/00; F01K 13/00; G21C 1/322
See application file for complete search history.

(56) References Cited

U.S. PATENT DOCUMENTS

| | | | | |
|---|---|---|---|---|
| 2010/0258309 | A1 | 10/2010 | Ayodele et al. | |
| 2011/0068575 | A1 | 3/2011 | Zabtcioglu | |
| 2011/0100006 | A1 | 5/2011 | No et al. | |
| 2011/0131991 | A1* | 6/2011 | Oh .......................... | C01B 3/042 422/162 |
| 2011/0198085 | A1 | 8/2011 | O'Brien | |
| 2011/0200158 | A1 | 8/2011 | Hyde et al. | |
| 2014/0015098 | A1 | 1/2014 | Mcintyre | |
| 2017/0152605 | A1 | 6/2017 | Izgorodin | |
| 2017/0213610 | A1 | 7/2017 | Sumita | |
| 2020/0135345 | A1 | 4/2020 | Kutsch et al. | |
| 2021/0110940 | A1 | 4/2021 | Botha et al. | |
| 2023/0287583 | A1 | 9/2023 | Francis et al. | |

OTHER PUBLICATIONS

Fujiwara et al. "Hydrogen production by high temperature electrolysis with nuclear reactor." Progress in Nuclear Energy 50.2-6 (2008): 422-426. Retrieved on Mar. 11, 2024 from https://www.researchgate.net/profile/Takashi-Ogawa3/publication/236482800_Hydrogen_Production_by_High_Temperature_Electrolysis_with_Nuc ear_Reactor/links/54ead96f0cf27a6dell4e7a5/Hydrogen-Production-by-High-Temperature-Electrolysiswith-Nuclear-Reactor.pdf> entire document.
Office Action for U.S. Appl. No. 18/104,766, Dated Jul. 15, 2024, 9 pages.
The PCT Search Report and Written Opinion mailed Apr. 17, 2024 for PCT Application No. PCT/US23/14404, 16 pages.
Office Action for Canadian Application No. 3,244,256, dated Oct. 1, 2024, 6 pages.
Office Action for Canadian Application No. 3,244,780, dated Oct. 1, 2024, 4 pages.
International Preliminary Report on Patentability, dated Sep. 19, 2024 for PCT Application No. PCT/US2023/014404, 12 pages.
Bicer, et al., "Life cycle assessment of nuclear-based hydrogen and ammonia production options: A comparative evaluation," International Journal of Hydrogen Energy, vol. 42, No. 33, 2017, pp. 21559-21570.
Locatelli, et al., "Load following of Small Modular Reactors (SMR) by cogeneration of hydrogen: A techno-economic analysis," Energy, vol. 148, 2018, pp. 494-505.
Mikulcic, et al., "Flexible Carbon Capture and Utilization technologies in future energy systems and the utilization pathways of captured CO2," Renewable and Sustainable Energy Reviews, vol. 114. 2019, pp. 1-20.
Partial Search Report for European Application No. 23868742.0, dated Jan. 28, 2026, 18 pages.

* cited by examiner

Anode process: $2\ O^{2-} \rightarrow O_2 + 4\ e^-$
Anode electrode
Composites including yttria-stabilized zirconia (YSZ) and either (La, Sr)$MnO_{3-\delta}$ (LSM), (La Sr)$CoO_{3-\delta}$ (LSC) or (La, Sr)(Co, Fe)$O_{3-\delta}$(LSCF)[1] LSM is an $ABO_3$ perovskite where A = La, Sr and B = Mn; LSCF exhibits a distorted hexagonal perovskite structure.

Cathode process: $2H_2O + 4\ e^- \rightarrow 2\ O^{2-} + 2H_2$
Cathode electrode
Cermet including Nickel, used as the catalyst, and the solid electrolyte included in the electrolyzer, typically yttria-stabilized zirconia (YSZ) or scandia-stabilized zirconia (ScSZ).

Electrolyte
- Yttria-stabilized Zirconia (YSZ) including 8 mol% OF $Y_2O_3$ into $ZrO_2$.
- Scandia-stabilized Zirconia (ScSZ) including 9 mol% OF $SC_2O_3$ into $ZrO_2$.

in YSZ and ScSZ the cubic phase is stabilized and does not undergo destructive phase change upon cooling to tetragonal and monoclinic. Good compatibility with electrodes. ScSZ exhibits slightly better conductivity at lower T than YSZ.

*FIG. 14B*
*(Prior Art)*

Anode process: $2\ H_2O \rightarrow 4\ H^+ + O_2 + 4\ e^-$ ($E^0$ =1.23 V)

Anode electode

- Ir, $IrO_x$ catalyst layer touches the proton-exchange membrane in «zero-gap» configuration; Ir loading > 2 mg/cm²[1].
- A porous metal mesh, typically based on Ti, («porous transport layer - PTL») is sandwiched between the anode catalyst layer and the bipolar plate.

Cathode process: $4\ H^+ + 4\ e^- \rightarrow 2\ H2$ ($E^0$ = 0.0 V)

Cathode electrode

- Catalyst layer made of Pt nanoparticles touches the proton-exchange membrane in «zero-gap» configuration; Pt loading < 0.1 mg/cm²[2]
- Porous carbon ( «gas-diffusion layer _ GDL») is sandwiched between the cathode catalyst layer and the bipolar plate.

Proton-exchange membrane

Nafion™ or other perfluorinated

Ionomers, thickness 120 – 180 Microns.

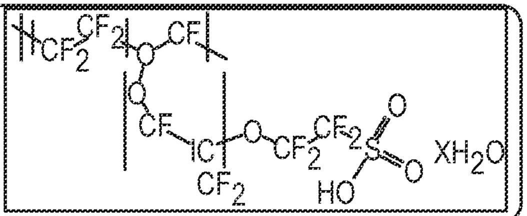

*FIG. 15B*
*(Prior Art)*

SMALL MODULAR NUCLEAR REACTOR INTEGRATED ENERGY SYSTEMS FOR ENERGY PRODUCTION AND GREEN INDUSTRIAL APPLICATIONS

CROSS-REFERENCE TO RELATED APPLICATION

This application claims the benefit of U.S. Provisional Patent Application No. 63/316,959, filed Mar. 4, 2022, and titled "INTEGRATED ENERGY SYSTEMS FOR ENERGY PRODUCTION AND GREEN INDUSTRIAL APPLICATIONS," which is incorporated herein by reference in its entirety.

TECHNICAL FIELD

The present technology is directed to small modular nuclear reactor (SMR) integrated energy systems (IESs) for energy production and green industrial applications, and associated devices and methods.

BACKGROUND

I. Summary

Many processes in the petroleum, chemical, pharmaceutical, and material manufacturing industries require a combination of electrical power, steam, heat, hydrogen, carbon dioxide ($CO_2$), oxygen, methanol, and/or urea to operate and to produce industrial products. Currently, for example, the predominant method of producing hydrogen for methanol, urea, and/or ammonia (e.g., fertilizer) production is steam-methane reforming in which natural gas containing methane ($CH_4$) is used both as a feedstock and a combustion fuel for process heat. Indeed, steam-methane reforming processes account for more than 95% of all hydrogen production in the United States. Clean energy mandates require that such processes limit emissions of carbon dioxide and oxides of nitrogen and sulfur into the environment. But, unfortunately, steam-methane reforming is still being used-resulting in significant carbon (e.g., $CO_2$) emissions. Capturing $CO_2$ from the atmosphere and subsequently sequestering the $CO_2$ is one approach to off-setting $CO_2$ emissions from steam-methane reforming, but cleaner approaches are desired.

II. Carbon Emissions

Despite the sharp decrease in carbon emissions in 2020 linked to COVID-19 pandemics, the climate crisis, which is driven by the accumulation of emissions of $CO_2$ in the atmosphere over time, continues to affect the global environment. From 1990 to 2015, for example, annual $CO_2$ emissions grew by 60%, and the cumulative emissions doubled.

Cumulative carbon dioxide emissions are the dominant driver of climate change. Such emissions began rising during the Industrial Revolution (especially after 1850)—which means wealthier countries like the United States, which made an early transition to a heavily fossil fuel-based economic system, have an outsized role in contributing to the climate impacts seen around the world today. Both in terms of cumulative emissions, and current per capita emissions, wealthier countries rank high. Conversely, low-income and middle-income countries have lower cumulative historical emissions and per capita emissions. Even within countries, it is the relatively wealthy that are responsible for a majority of carbon emissions. The following is a listing of the 15 largest $CO_2$ emitting countries in the world based on cumulative emissions from 1750-2020 from fossil fuels:

| Rank | Country | $CO_2$ emissions (total) |
|---|---|---|
| 1 | United States | 416,738 metric megatons (MMT) |
| 2 | China | 235,527 MMT |
| 3 | Russia | 115,335 MMT |
| 4 | Germany | 92,636 MMT |
| 5 | United Kingdom | 78,161 MMT |
| 6 | Japan | 65,617 MMT |
| 7 | India | 54,423 MMT |
| 8 | France | 38,729 MMT |
| 9 | Canada | 33,571 MMT |
| 10 | Ukraine | 30,558 MMT |
| 11 | Poland | 27,862 MMT |
| 12 | Italy | 24,736 MMT |
| 13 | South Africa | 21,163 MMT |
| 14 | Mexico | 20,071 MMT |
| 15 | Iran | 18,909 MMT |

Both the United States and the European Union have announced aggressive hydrogen production, research, energy conversion, and green programs to reduce $CO_2$ emissions. In addition, these and other countries have established hydrogen-based taxonomy programs and incentives on $CO_2$ footprints and offsetting of carbon credits.

The seven largest $CO_2$ emission industries in the world are: (1) power plants (coal, natural gas, oil fired), (2) oil refinery plants, (3) ammonia production plants, (4) chemical manufacturing and production plants, (5) cement production plants, (6) steel manufacturing plants, and (7) transportation. Coincidentally, hydrogen is used in each of the above industries (2)-(7). Currently, most of the hydrogen produced in the United States comes from steam-methane reforming processes. In the United States, steam-methane reforming processes accounted for more than 95% of all hydrogen production and produced about 10 million metric tons (MT) of $H_2$ each year. Nearly 70% of this hydrogen is used in the petroleum refining industry, and 20% is used for fertilizer production. The remaining 10% is used in chemical and material production processes. Very little goes into transportation.

III. NuScale Power Plants

The NuScale Power Module™ (NPM) is a 250-megawatt thermal (MWt) integral pressurized water reactor (PWR) that employs gravity-driven natural circulation of the primary coolant for both normal operation and shutdown mode. The NPM, including containment, is fully factory-built and shipped to the plant site by truck, rail, or barge. NuScale's flagship VOYGR-12 power plant design can accommodate up to 12 NPMs, resulting in a total gross output of 924 megawatts electric (MWe). Other configurations include smaller power plant solutions, such as the four-module VOYGR-4 (308 MWe) and the six-module VOYGR-6 (462 MWe).

NuScale VOYGR NPM design, testing, and analysis activities to support a design certification application (DCA) with the U.S. Nuclear Regulatory Commission (NRC) have been underway for several years. Following extensive pre-application activities conducted with the NRC since 2008, the DCA was submitted, and review commenced by the NRC in March 2017. The NRC completed the final phase of the review with the issuance of the Final Safety Evaluation Report (FSER) in August 2020, making NuScale the first ever small modular reactor (SMR) to receive NRC approval.

By 2030, a NuScale power plant will become part of the Carbon Free Power Project (CFPP), an initiative spearheaded by the Utah Associated Municipal Power Systems (UAMPS). UAMPS is a consortium of 48 public power utilities with service areas in eight western states. Interest in NuScale's technology from other power companies continues to build in the United States, as states have or intend to pass legislation for reducing $CO_2$ emissions and/or establishing clean energy goals.

IV. Hydrogen Production

Hydrogen ($H_2$) has many attractive properties as an energy carrier. For example, hydrogen has a high energy density (140 MJ/kg) which is more than two times higher than typical fuels, such as gasoline (46 MJ/kg) and diesel (45 MJ/kg). Hydrogen can be transported (fed) directly into oil refineries for desulfurization of diesel and crude oil, and can be used to make ammonia via the Haber-Bosch process.

Hydrogen, methane, and carbon monoxide can be produced from biomass via pyrolysis. Wood, organic waste, animal waste, waste from food processing, and agricultural crops and its byproducts are all sources of biomass. Biomass pyrolysis is basically:

$$\text{Biomass} + \text{Heat} \rightarrow CH_4 + CO + CO_2 + H_2 + \text{light hydrocarbons}$$

While producing hydrogen, biomass also generates large amounts of carbon dioxide emissions.

Currently, over 98% of the world's hydrogen is produced using steam-methane reforming processes. In the United States, more than 95% of hydrogen is produced using steam-methane reforming with an annual hydrogen production of about 10 million MT. In this reaction, natural gas is reacted with steam at an elevated temperature to produce carbon monoxide and hydrogen. A subsequent reaction—the water gas shift reaction—then reacts additional steam with the carbon monoxide to produce additional hydrogen and carbon dioxide. FIG. 10 is a schematic diagram of a typical steam-methane reforming process.

Steam reforming is a combination of endothermic (e.g., heat added) and exothermic (e.g., heat produced) reactions and comprises the following reactions:

First Reaction (steam reforming reaction):

$$CH_4 \text{ (Natural gas)} + H_2O \text{ (Steam)} \Leftrightarrow CO + 3H_2 \text{ Endothermic 206 kJ/mol}$$

Second Reaction (Water-Gas Shift Reaction):

$$CO + H_2O \Leftrightarrow CO_2 + H_2 \text{ Exothermic -41 kJ/mol}$$

The entire reaction can be written as:

$$CH_4 + 2H_2O \Leftrightarrow CO_2 + 4H_2 \text{ Endothermic 165 kJ/mol}$$

In most modern steam-methane reforming processes, desulfurization is carried out to remove sulfur from the natural gas prior to the reforming process. Desulfurization is also carried out in refining petroleum products, such as gasoline or petrol, jet fuel, kerosene, diesel fuel, and fuel oils. The purpose of removing the sulfur is to reduce the sulfur dioxide ($SO_2$) emissions that result from using those fuels in automotive vehicles, aircraft, railroad locomotives, ships, gas or oil burning power plants, residential and industrial furnaces, and other forms of fuel combustion.

The desulfurization process uses hydrogen. FIGS. 11 and 12 are schematic diagrams of typical natural gas desulfurization processes. Desulfurization is typically referred to as "pre-reforming." Referring to FIG. 11, during this process, methane and heavier hydrocarbons are steam reformed and the products of the heavier hydrocarbon reforming are methanated. An adiabatic pre-reformer is usually positioned upstream of a main steam reformer and uses a catalyst with high nickel content.

Referring to FIG. 12, hydrogen is used in the steam-methane reforming process to remove the sulfur from the natural gas prior to the reforming process. This hydrogen is expensive and has a large carbon footprint because fossil fuel energy sources are used for its production. The desulfurization process (e.g., sulfur recovery) can be carried out according to the equations:

$$2H_2S + 3O_2 \rightarrow 2SO_2 + 2H_2O + \text{heat}$$

$$2H_2S + 2SO_2 \rightarrow 2S + 2H_2O + \text{heat}$$

Sulfuric Acid can then be produced according to the equations $$S + O_2 \rightarrow SO_2$$

$$2SO_2 + O_2 \rightarrow 2SO_3$$

$$SO_3 + H_2O \rightarrow H_2SO_4$$

It has been determined that for ~2.32 MT (1 million standard cubic feet (SCF)) of hydrogen produced, there will be ~13 MT of $CO_2$ generated. The estimates for the carbon footprint associated with the individual process steps are: (1) 3.7 MT from combustion for reforming energy, (2) 2.5 MT from combustion for steam generation, and (3) 0.1 MT for power for separating and compressing the hydrogen.

Adding this to the carbon dioxide produced from the natural gas reactions, the total $CO_2$ generations becomes 19.3 MT per 2.32 MT of hydrogen produced. This value is the theoretical minimum—due to heat lost and mechanical inefficiencies, the actual number in practice is about 22 MT of $CO_2$. This converts to ~9.3 kg of $CO_2$ produced per kg of hydrogen production. The United States generates about 100 million MT of $CO_2$ from steam-methane reforming processes per year.

Oil refineries consume large amounts of hydrogen to desulfurize diesel fuel. Currently, most of the hydrogen is supplied by fossil fuels via the steam reforming process while only a small portion of hydrogen (i.e., "green" hydrogen) is produced using carbon-free energies through water electrolysis processes. This is because the energy cost for electricity required in the electrolysis process is much higher than that for natural gas in the steam-methane reforming process. Given that energy is the cost driver for water electrolysis, bringing the cost target on par with that of steam reforming is a massive undertaking.

FIG. 13 is a graph illustrating refinery demand for hydrogen in the United States from 2008-2014. Comparing 2008 and 2014, on-site refinery hydrogen production changed very little (less than 1%), while hydrogen supplied by gas producers increased by 135%. Thus, for an oil refinery plant, the delivered cost of hydrogen is more relevant than its production cost. The delivered cost also includes hydrogen transportation and storage costs. Because hydrogen has a very low density and the potential to cause embrittlement in steel, transportation and storage costs either through pipeline or tankers are considerably more expensive for hydrogen than for natural gas. If the current grey hydrogen consumption in the U.S. refineries (approximately 6 million MT/year) is replaced with green hydrogen, one can expect ~2800 million MT/year of carbon dioxide will be removed from the atmosphere each year.

In addition, during the desulfurization of diesel fuel, sulfur dioxide ($SO_2$) is produced. The produced $SO_2$ gas can be re-captured and synthesized to regenerate elemental sulfur for the subsequent production of sulfuric acid, which is one of the most important acids for many industrial processes and material production processes. In 2011, the United States recovered more than 8.1 million MT of elemental sulfur from oil refineries and coking plants valued at ~$1.6 Billion.

Water electrolysis technologies are classified into three basic categories based on the applied electrolyte: (1) high temperature steam electrolysis (HTSE) or solid oxide electrolysis, (2) liquid alkaline (LA; e.g., alkaline water) electrolysis, and (3) proton exchange membrane (PEM) water electrolysis. Both LA electrolysis and PEM electrolysis are low temperature electrolysis techniques. HTSE has the highest hydrogen production efficiencies when input steam temperature is operated in a temperature range of greater than 700° C., and is suitable for constant hydrogen production. LA electrolysis and PEM electrolysis are well-developed technologies that are commercially available and typically operate at much lower temperature and are less efficient than HTSE systems. PEM electrolysis systems have a more compact design than LA electrolysis systems and also have a lower operational input water temperature (typically $<100°$ C.).

HTSE cells are extremely efficient when the input steam temperature is maintained between 700 to 850° C. FIG. 14A is a schematic diagram of a typical HTSE fuel cell in which the inlet steam temperature is to be maintained between 700-850° C. FIG. 14B is a schematic description of a typical HTSE fuel cell process. Referring to FIGS. 14A and 14B, the representative HTSE cell has an all solid-state construction (ceramic and metal) and high operating temperature. The combination of these features leads to several distinctive and attractive attributes including cell and stack design flexibility, multiple fabrication options, and multi-fuel capability choices. The HTSE fuel cell technology is extremely efficient so long as the steam and system temperature can be maintained between 700-850° C.

FIG. 15A is a schematic diagram of a typical PEM electrolysis fuel cell in which the inlet water temperature can be room temperature. FIG. 15B is a schematic description of a typical PEM electrolysis fuel cell process.

V. Ammonia Production and Ammonia Industries

Ammonia is one of the most versatile inorganic chemicals. In 2016, a total of 180 million MT of ammonia was produced globally. China produced 31.9% of the worldwide production, followed by Russia with 8.7%, India with 7.5%, and the United States with 7.1%. 80% or more of produced ammonia is used for fertilizing agricultural crops.

Today, steam reforming first converts natural gas, liquefied petroleum gas, or petroleum naphtha into gaseous hydrogen. The hydrogen is then combined with nitrogen to produce ammonia via the Haber-Bosch process with capacities of up to 3,300 MT per day. In this process, $N_2$ and $H_2$ gases are allowed to react at pressures of 200 bar over nickel catalyst. The mass balance of the chemical reaction is 1 MT of $H_2$ combines with ~4.67 MT of $N_2$ will produce ~5.67 MT of ammonia Ammonia production is a highly energy intensive process and steam-methane reforming accounts for over 80% of the energy required and produces 500 million MT of $CO_2$. The United States is one of the world's leading producers and consumers of ammonia. In 2020, the production of ammonia in the United States was estimated to total around 127,000,000 MT. A total of 16 companies at 35 facilities in the United States produce ammonia currently. Between 50% of the produced ammonia in the United States is used for fertilizer production and the rest is shared among refrigeration, pharmaceuticals, textile, and cleaning products.

In 2010, ~160 million MT of ammonia was produced and more than 450 million MT of $CO_2$ were emitted via the ammonia synthesis. In 2018, China produced about 54 million MT of ammonia, and much is produced by coal-based plants.

Today, ammonia synthesis starts with generating $H_2$ from fossil-fuel feedstock. A reformer converts the feedstock into a mixture of gases called synthesis gas (syngas), which includes $H_2$. A CO shift converter combines water and the CO from syngas to form $CO_2$ and more hydrogen. Then, acid gas removal isolates the $H_2$ for ammonia synthesis. The process releases $CO_2$ at various steps along the way. FIG. 16 is a schematic diagram of a typical ammonia synthesis process.

VI. Nitrogen Production

Chemical and industrial companies rely on the industrial preparation of nitrogen for everyday production. It is necessary to extract nitrogen from the air so that it can be used in a purified state. Typically, nitrogen generators are used to produce ammonia ($NH_3$).

There are three different systems for the generation of nitrogen from air components: (1) pressure-swing-absorption (PSA) systems, (2) membrane systems, and (3) cryogenic systems. PSA systems utilize two towers which are filled with carbon molecular sieve (CMS). Compressed air enters the bottom of the "online" tower and flows up through the CMS. Oxygen and other trace gases are preferentially adsorbed by the CMS, allowing nitrogen to pass through. After a pre-set time, the on-line tower automatically switches to a regenerative mode, venting contaminants from the CMS. Carbon molecular sieve differs from ordinary activated carbons as it has a much narrower range of pore openings. This allows small molecules such as oxygen to penetrate the pores and separate from nitrogen molecules which are too large to enter the CMS. The larger nitrogen molecules bypass the CMS and emerge as nitrogen gas.

Membrane systems are easier to operate and have lower operating costs than the two other types of systems. They are built to separate compressed air through hollow-fiber membranes. They work by forcing compressed air into a vessel which selectively permeates oxygen, water vapor, and other impurities out of its side walls. The nitrogen flows through the center and emerges as gas.

Cryogenic systems begin by taking in atmospheric air into an air separation unit. The air is compressed in a compressor and the air components are separated by fractional distillation. Then, the air is moved to a cleanup system where impurities like hydrocarbons, moisture, and carbon dioxide are eliminated. Here, the air is directed into heat exchangers to liquefy it at cryogenic temperatures. At this stage, the air is put through a high-pressure distillation column where nitrogen is physically separated from oxygen and other gases. Nitrogen so formed is collected and put into a low-pressure distillation column where it is distilled until it meets commercial specifications.

Each of the above processes to generate nitrogen require large amounts of energy. There are carbon dioxide emissions along each of the steps for producing nitrogen.

VII. Urea Production

Urea ($NH_2CONH_2$) is produced from ammonia and "gaseous" carbon dioxide ($CO_2$) at high pressure and relatively high temperature. Urea helps feed about half of the world's population. Currently, making urea is a multistep endeavor that consumes a large amount of energy and emits huge amounts of $CO_2$.

FIG. 17 is a schematic diagram of a typical process for producing urea. Referring to FIG. 17, urea is made from ammonia and carbon dioxide. The ammonia and carbon dioxide are fed into a reaction chamber at high pressure and temperature. The urea is formed in a two-step reaction:

$$2NH_3 + CO_2 \Leftrightarrow NH_2COONH_4 \text{ (Ammonium Carbamate)}$$

$$NH_2COONH_4 \Leftrightarrow H_2O + NH_2CONH_2 \text{ (Urea)}$$

The urea contains unreacted $NH_3$ and $CO_2$ and ammonium carbamate. As the pressure is reduced and heat is applied, the $NH_2COONH_4$ decomposes to $NH_3$ and $CO_2$. The ammonia and carbon dioxide are recycled. The urea solution is then concentrated to produce greater than 99% molten urea and granulated urea for use as a fertilizer and chemical feedstock.

VIII. Carbon Dioxide Capture

Direct air capture (DAC) technology captures carbon dioxide ($CO_2$) by pulling in atmospheric air, then through a series of chemical reactions, extracting the $CO_2$ from it while returning the rest of the air to the environment. There are two distinctive, commercial DAC processes to bind with $CO_2$: liquid sorbents and solid solvents.

FIG. 18 is a schematic diagram of a typical liquid sorbent process for capturing carbon dioxide from air. Referring to FIG. 18, the process starts with an air contactor—a large structure modeled off industrial cooling towers. A giant fan pulls air into this structure, where it passes over thin plastic surfaces that have alkaline solutions (e.g., potassium-hydroxide and/or sodium-hydroxide solutions) flowing over them. The alkaline solution chemically binds with the $CO_2$ molecules, removing them from the air and trapping them in the liquid solution as a carbonate salt.

The $CO_2$ contained in this carbonate solution is then put through a series of chemical processes to increase its concentration and purify and compress it, so it can be delivered in gas form ready for use or storage. This involves separating the salt out from solution into small pellets in a structure called a pellet reactor, which was adapted from water treatment technology. These pellets are then heated in a third step, a calciner, to release the $CO_2$ in pure gas form. The calciner is similar to equipment that is used at very large scale in mining for ore processing. This step also leaves behind processed pellets that are hydrated in a slaker and recycled back into the system to reproduce the original capture chemical. FIG. 19 is a more detailed flow diagram of a typical liquid sorbent process for capturing carbon dioxide from air.

DAC processes based on solid sorbents depend significantly on ambient air conditions. For example, high ambient temperature or low humidity leads to higher energy consumption and lower $CO_2$ capture, and eventually lower $CO_2$ capture efficiency. FIG. 20 is a schematic diagram of a typical solid sorbent DAC process. In particular, FIG. 20 shows the process flow of a stationary bed solid sorbent DAC process. In this process, air is pushed through a contactor unit by fans and $CO_2$ adsorbs onto the solid sorbent at ambient conditions. After the solid sorbent is saturated with $CO_2$, or has reached the desired $CO_2$ uptake, the apparatus is switched from adsorption to desorption mode. At this stage, the contactor is closed off from the surrounding environment. A vacuum pump evacuates residual air from the contactor to prevent dilution of the produced $CO_2$ by residual oxygen and nitrogen in the contactor and to minimize the solid sorbent degradation from air. Following the vacuum stage, steam is sent into the contactor to heat the material to the regeneration temperature (roughly 80-120° C.). The steam additionally flushes the released $CO_2$ from the contactors, which is then separated from water in the condenser and sent to compression for subsequent transportation, storage, or utilization.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

FIG. 14B is a schematic description of a typical HTSE fuel cell process.

FIG. 15B is a schematic description of a typical PEM electrolysis fuel cell process.

DETAILED DESCRIPTION

Figure 1:
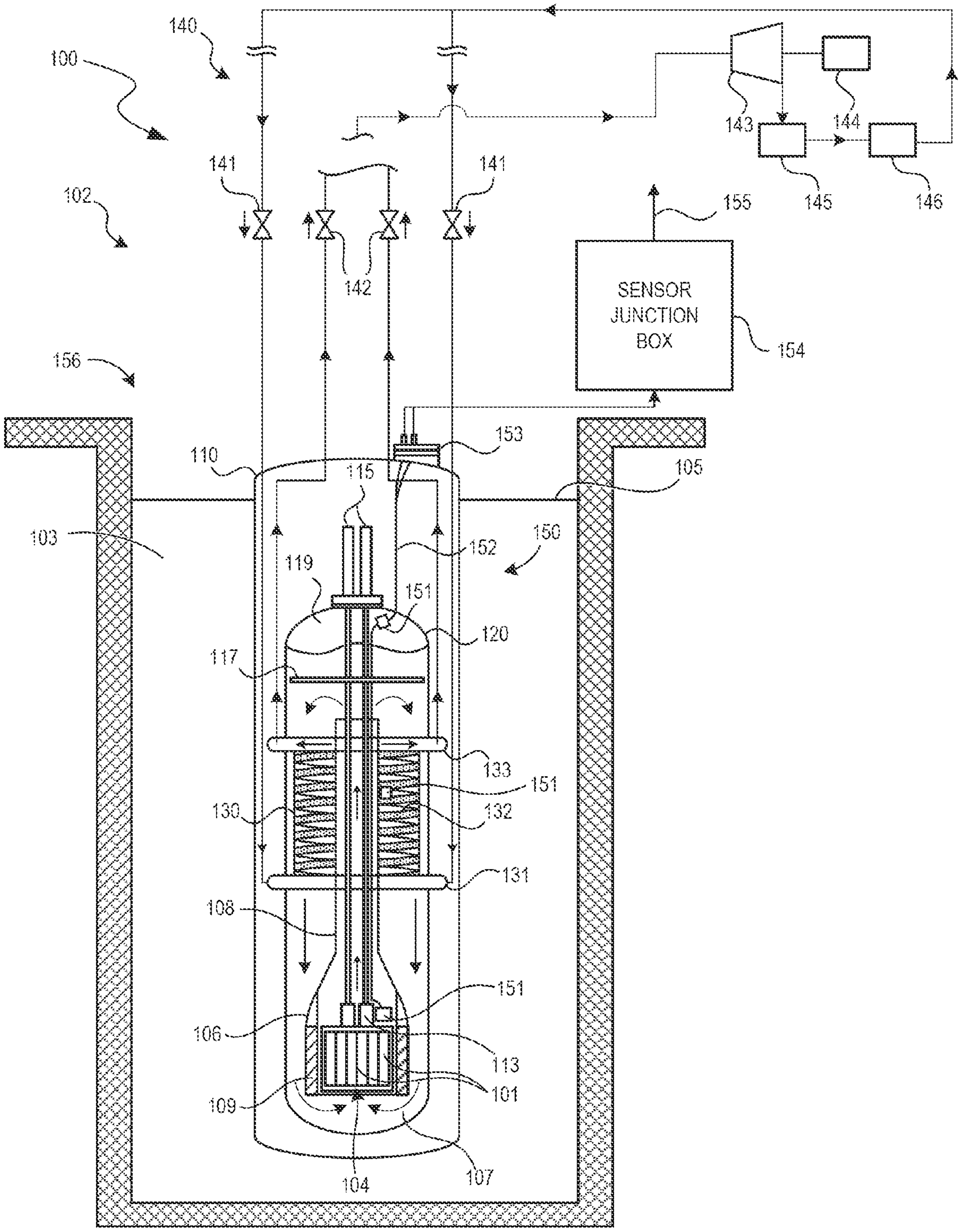
FIG. 1 is a partially schematic, partially cross-sectional view of a small modular reactor system configured in accordance with embodiments of the present technology.

Aspects of the present technology are directed generally toward integrated energy systems, such as for use in green industrial processes that produce few or no carbon emissions, and associated devices and methods. The industrial processes can include, for example, the production of hydrogen, oxygen, nitrogen, ammonia, urea, sulfur, sulfuric acid, and/or other useful chemicals.

In some embodiments, an integrated energy system includes a power plant system having multiple small modular nuclear reactors (SMRs) specifically configured to operate in unison to support one or more of the industrial processes. SMRs are nuclear reactors that are smaller in terms of size (e.g., dimensions) and power compared to large, conventional nuclear reactors. Moreover, they are modular in that some or all of their systems and components can be factory-assembled and transported as a unit to a location for installation. In some aspects of the present technology, the multiple SMRs of the integrated energy system can flexibly and dynamically provide electricity, steam, or a combination of both electricity and steam to the industrial processes due to the modularity and flexibility of the SMRs. That is, a configuration of the SMRs can be switched during operation to provide varying levels of steam and electricity output depending on the operational states and/or demands of the industrial processes.

In some embodiments, the power plant system is operably coupled to a hydrogen and oxygen production plant configured to process water and/or steam to produce hydrogen and oxygen. The hydrogen and oxygen production plant can utilize a high temperature steam electrolysis (HTSE) process and/or low temperature steam electrolysis (LTSE) process. Accordingly, the power plant system can route (i) high temperature steam (e.g., via an auxiliary heater) and electricity to the hydrogen and oxygen production plant for use in the HTSE process and (ii) electricity to the hydrogen and oxygen production plant for use in the LTSE process. In some embodiments, the integrated energy system includes a water treatment plant and/or water desalination plant electrically coupled to the power plant system and configured to provide high-quality water to the hydrogen and oxygen production plant for use in the LTSE process.

In some aspects of the present technology, the HTSE process can be more efficient than the LTSE process. However, the LTSE process can have a more compact design, can work with lower temperature input water (e.g., less than 100° C., room temperature), can be less susceptible to water quality characteristics, and can require less frequent maintenance. Accordingly, utilizing both an HTSE process and an LTSE process in the hydrogen and oxygen production plant can provide redundancy that can improve the overall reliability of hydrogen and oxygen production. In some embodiments, the power plant system can be controlled to selectively provide electricity, steam, and/or water to the HTSE process and the LTSE process. For example, during normal operation, more electricity and steam can be routed for use in the HTSE process to increase the output of the HTSE process to capitalize on its higher efficiency, while excess electricity can be used to operate the LTSE process for supplemental hydrogen and oxygen production. Then, during servicing, maintenance, and/or other operations on the HTSE process systems, more of the electricity can be routed to the LTSE process to generate hydrogen and oxygen during a period when the HTSE process would otherwise be fully or partially offline.

Accordingly, the integrated energy system can produce both green hydrogen and green oxygen. The integrated energy system can further include additional industrial process plants operably coupled to the power plant system and configured to utilize the green hydrogen and/or green oxygen in further industrial processes. For example, the integrated energy system can further include (i) an ammonia production plant configured to utilize the green hydrogen and nitrogen from a nitrogen source (e.g., a nitrogen generator powered by the same power plant system) to produce green ammonia, (ii) a urea production plant configured to utilize the green ammonia and carbon dioxide from a carbon dioxide source (e.g., a direct air capture (DAC) plant powered by the same power plant system) to produce green urea, (iii) an oil refinery plant configured to utilize the hydrogen to desulfurize natural gas and/or produce elemental sulfur for sulfuric acid production, (iv) a steel processing plant configured to utilize the oxygen in a basic oxygen steelmaking (BOS) process to produce high-quality steel, etc. The power plant system can further power some or all of these additional processes.

Certain details are set forth in the following description and in FIGS. 1-9 to provide a thorough understanding of various embodiments of the present technology. In other instances, well-known structures, materials, operations, and/or systems often associated with nuclear reactors, power plant systems, integrated energy systems, chemical production plants, industrial process plants, electrolysis systems, hydrogen and oxygen production plants, direct air capture (DAC) plants, oil refineries, and the like, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology.

The accompanying Figures depict embodiments of the present technology and are not intended to limit its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

To the extent any materials incorporated herein by reference conflict with the present disclosure, the present disclosure controls. The headings provided herein are for convenience only and should not be construed as limiting the subject matter disclosed.

I. Select Embodiments of Nuclear Reactor Power Conversion Systems

Figure 2:
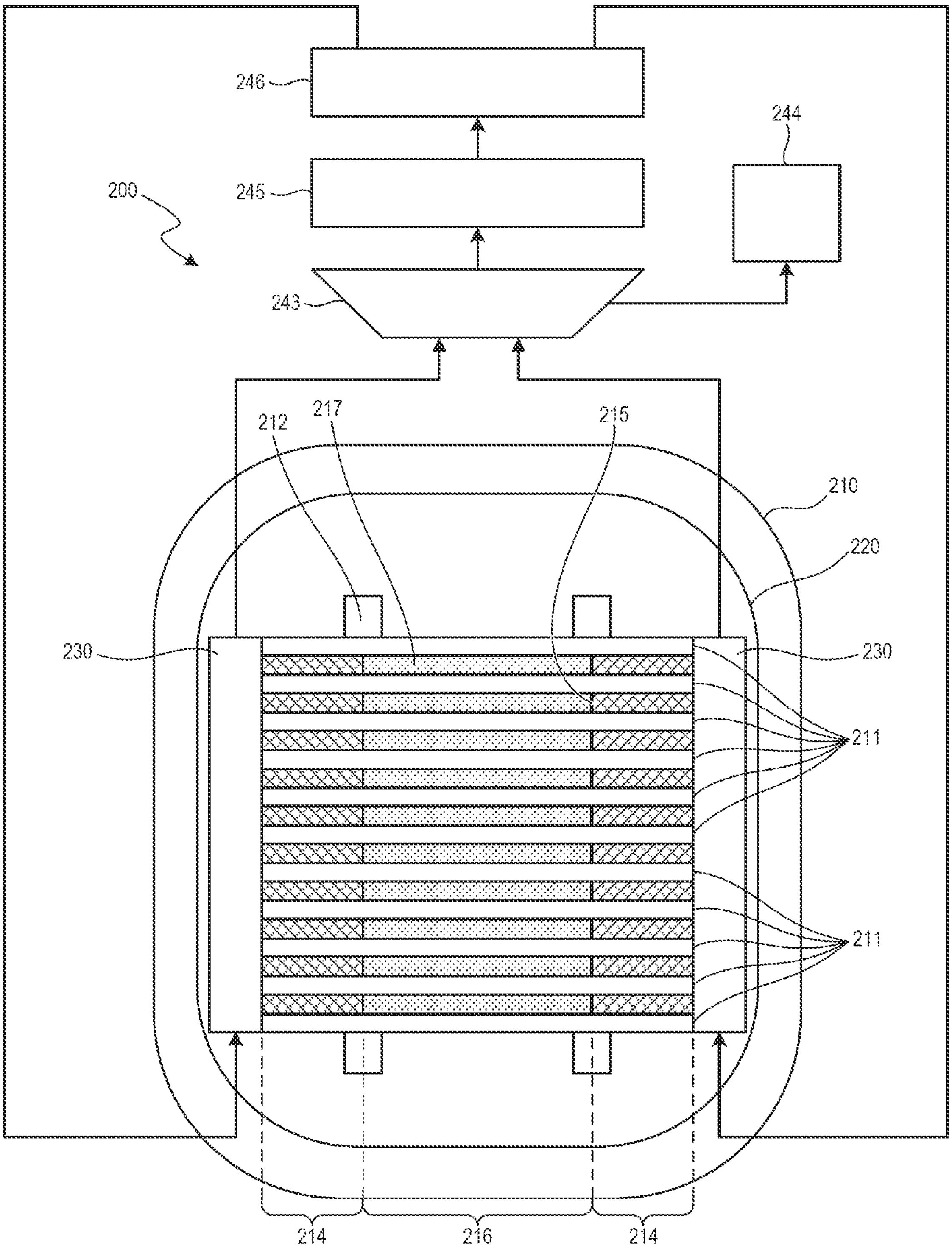
FIG. 2 is a partially schematic, partially cross-sectional view of a small modular reactor system configured in accordance with additional embodiments of the present technology.

FIGS. 1 and 2 illustrate representative nuclear reactors that may be included in embodiments of the present technology. FIG. 1 is a partially schematic, partially cross-sectional view of a nuclear reactor system 100 configured in accordance with embodiments of the present technology. The system 100 can include a power module 102 having a reactor core 104 in which a controlled nuclear reaction takes place. Accordingly, the reactor core 104 can include one or more fuel assemblies 101. The fuel assemblies 101 can include fissile and/or other suitable materials. Heat from the reaction generates steam at a steam generator 130, which directs the steam to a power conversion system 140. The power conversion system 140 generates electrical power, and/or provides other useful outputs, such as super-heated steam. A sensor system 150 is used to monitor the operation of the power module 102 and/or other system components. The data obtained from the sensor system 150 can be used in real time to control the power module 102, and/or can be used to update the design of the power module 102 and/or other system components.

The power module 102 includes a containment vessel 110 (e.g., a radiation shield vessel, or a radiation shield container) that houses/encloses a reactor vessel 120 (e.g., a reactor pressure vessel, or a reactor pressure container), which in turn houses the reactor core 104. The containment vessel 110 can be housed in a power module bay 156. The power module bay 156 can contain a cooling pool 103 filled with water and/or another suitable cooling liquid. The bulk of the power module 102 can be positioned below a surface 105 of the cooling pool 103. Accordingly, the cooling pool 103 can operate as a thermal sink, for example, in the event of a system malfunction.

A volume between the reactor vessel 120 and the containment vessel 110 can be partially or completely evacuated to reduce heat transfer from the reactor vessel 120 to the surrounding environment (e.g., to the cooling pool 103). However, in other embodiments the volume between the reactor vessel 120 and the containment vessel 110 can be at least partially filled with a gas and/or a liquid that increases heat transfer between the reactor vessel 120 and the containment vessel 110. For example, the volume between the reactor vessel 120 and the containment vessel 110 can be at least partially filled (e.g., flooded with the primary coolant 107) during an emergency operation.

Within the reactor vessel 120, a primary coolant 107 conveys heat from the reactor core 104 to the steam generator 130. For example, as illustrated by arrows located within the reactor vessel 120, the primary coolant 107 is heated at the reactor core 104 toward the bottom of the reactor vessel 120. The heated primary coolant 107 (e.g., water with or without additives) rises from the reactor core 104 through a core shroud 106 and to a riser tube 108. The hot, buoyant primary coolant 107 continues to rise through the riser tube 108, then exits the riser tube 108 and passes downwardly through the steam generator 130. The steam generator 130 includes a multitude of conduits 132 that are arranged circumferentially around the riser tube 108, for example, in a helical pattern, as is shown schematically in FIG. 1. The descending primary coolant 107 transfers heat to a secondary coolant (e.g., water) within the conduits 132, and descends to the bottom of the reactor vessel 120 where the cycle begins again. The cycle can be driven by the changes in the buoyancy of the primary coolant 107, thus reducing or eliminating the need for pumps to move the primary coolant 107.

The steam generator 130 can include a feedwater header 131 at which the incoming secondary coolant enters the steam generator conduits 132. The secondary coolant rises through the conduits 132, converts to vapor (e.g., steam), and is collected at a steam header 133. The steam exits the steam header 133 and is directed to the power conversion system 140.

The power conversion system 140 can include one or more steam valves 142 that regulate the passage of high pressure, high temperature steam from the steam generator 130 to a steam turbine 143. The steam turbine 143 converts the thermal energy of the steam to electricity via a generator 144. The low-pressure steam exiting the turbine 143 is condensed at a condenser 145, and then directed (e.g., via a pump 146) to one or more feedwater valves 141. The feedwater valves 141 control the rate at which the feedwater re-enters the steam generator 130 via the feedwater header 131. In other embodiments, the steam from the steam generator 130 can be routed for direct use in an industrial process, such as a hydrogen and oxygen production plant, a chemical production plant, and/or the like, as described in detail below. Accordingly, steam exiting the steam generator 130 can bypass the power conversion system 140.

The power module 102 includes multiple control systems and associated sensors. For example, the power module 102 can include a hollow cylindrical reflector 109 that directs neutrons back into the reactor core 104 to further the nuclear reaction taking place therein. Control rods 113 are used to modulate the nuclear reaction, and are driven via fuel rod drivers 115. The pressure within the reactor vessel 120 can be controlled via a pressurizer plate 117 (which can also serve to direct the primary coolant 107 downwardly through the steam generator 130) by controlling the pressure in a pressurizing volume 119 positioned above the pressurizer plate 117.

The sensor system 150 can include one or more sensors 151 positioned at a variety of locations within the power module 102 and/or elsewhere, for example, to identify operating parameter values and/or changes in parameter values. The data collected by the sensor system 150 can then be used to control the operation of the system 100, and/or to generate design changes for the system 100. For sensors positioned within the containment vessel 110, a sensor link 152 directs data from the sensors to a flange 153 (at which the sensor link 152 exits the containment vessel 110) and directs data to a sensor junction box 154. From there, the sensor data can be routed to one or more controllers and/or other data systems via a data bus 155.

FIG. 2 is a partially schematic, partially cross-sectional view of a nuclear reactor system 200 ("system 200") configured in accordance with additional embodiments of the present technology. In some embodiments, the system 200 can include some features that are at least generally similar in structure and function, or identical in structure and function, to the corresponding features of the system 100 described in detail above with reference to FIG. 1, and can operate in a generally similar or identical manner to the system 100.

In the illustrated embodiment, the system 200 includes a reactor vessel 220 and a containment vessel 210 surrounding/enclosing the reactor vessel 220. In some embodiments, the reactor vessel 220 and the containment vessel 210 can be roughly cylinder-shaped or capsule-shaped. The system 200 further includes a plurality of heat pipe layers 211 within the reactor vessel 220. In the illustrated embodiment, the heat pipe layers 211 are spaced apart from and stacked over one another. In some embodiments, the heat pipe layers 211 can be mounted/secured to a common frame 212, a portion of the reactor vessel 220 (e.g., a wall thereof), and/or other suitable structures within the reactor vessel 220. In other embodiments, the heat pipe layers 211 can be directly stacked on top of one another such that each of the heat pipe layers 211 supports and/or is supported by one or more of the other ones of the heat pipe layers 211.

In the illustrated embodiment, the system 200 further includes a shield or reflector region 214 at least partially surrounding a core region 216. The heat pipes layers 211 can be circular, rectilinear, polygonal, and/or can have other shapes, such that the core region 216 has a corresponding three-dimensional shape (e.g., cylindrical, spherical). In some embodiments, the core region 216 is separated from the reflector region 214 by a core barrier 215, such as a metal wall. The core region 216 can include one or more fuel sources, such as fissile material, for heating the heat pipes layers 211. The reflector region 214 can include one or more materials configured to contain/reflect products generated by burning the fuel in the core region 216 during operation of the system 200. For example, the reflector region 214 can include a liquid or solid material configured to reflect neutrons and/or other fission products radially inward toward the core region 216. In some embodiments, the reflector region 214 can entirely surround the core region 216. In other embodiments, the reflector region 214 may partially surround the core region 216. In some embodiments, the core region 216 can include a control material 217, such as a moderator and/or coolant. The control material 217 can at least partially surround the heat pipe layers 211 in the core region 216 and can transfer heat therebetween.

In the illustrated embodiment, the system 200 further includes at least one heat exchanger 230 (e.g., a steam generator) positioned around the heat pipe layers 211. The heat pipe layers 211 can extend from the core region 216 and at least partially into the reflector region 214, and are thermally coupled to the heat exchanger 230. In some embodiments, the heat exchanger 230 can be positioned outside of or partially within the reflector region 214. The heat pipe layers 211 provide a heat transfer path from the core region 216 to the heat exchanger 230. For example, the heat pipe layers 211 can each include an array of heat pipes that provide a heat transfer path from the core region 216 to the heat exchanger 230. When the system 200 operates, the fuel in the core region 216 can heat and vaporize a fluid within the heat pipes in the heat pipe layers 211, and the fluid can carry the heat to the heat exchanger 230. The heat pipes in the heat pipe layers 211 can then return the fluid toward the core region 216 via wicking, gravity, and/or other means to be heated and vaporized once again.

In some embodiments, the heat exchanger 230 can be similar to the steam generator 130 of FIG. 1 and, for example, can include one or more helically-coiled tubes that wrap around the heat pipe layers 211. The tubes of the heat exchanger 230 can include or carry a working fluid (e.g., a coolant such as water or another fluid) that carries the heat from the heat pipe layers 211 out of the reactor vessel 220 and the containment vessel 210 for use in generating electricity, steam, and/or the like. For example, in the illustrated embodiment the heat exchanger 230 is operably coupled to a turbine 243, a generator 244, a condenser 245, and a pump 246. As the working fluid within the heat exchanger 230 increases in temperature, the working fluid may begin to boil and vaporize. The vaporized working fluid (e.g., steam) may be used to drive the turbine 243 to convert the thermal potential energy of the working fluid into electrical energy via the generator 244. The condenser 245 can condense the working fluid after it passes through the turbine 243, and the pump 246 can direct the working fluid back to the heat exchanger 230 where it can begin another thermal cycle. In other embodiments, steam from the heat exchanger 230 can be routed for direct use in an industrial process, such as an enhanced oil recovery operation described in detail below. Accordingly, steam exiting the heat exchanger 230 can bypass the turbine 243, the generator 244, the condenser 245, the pump 246, etc.

Figure 3:
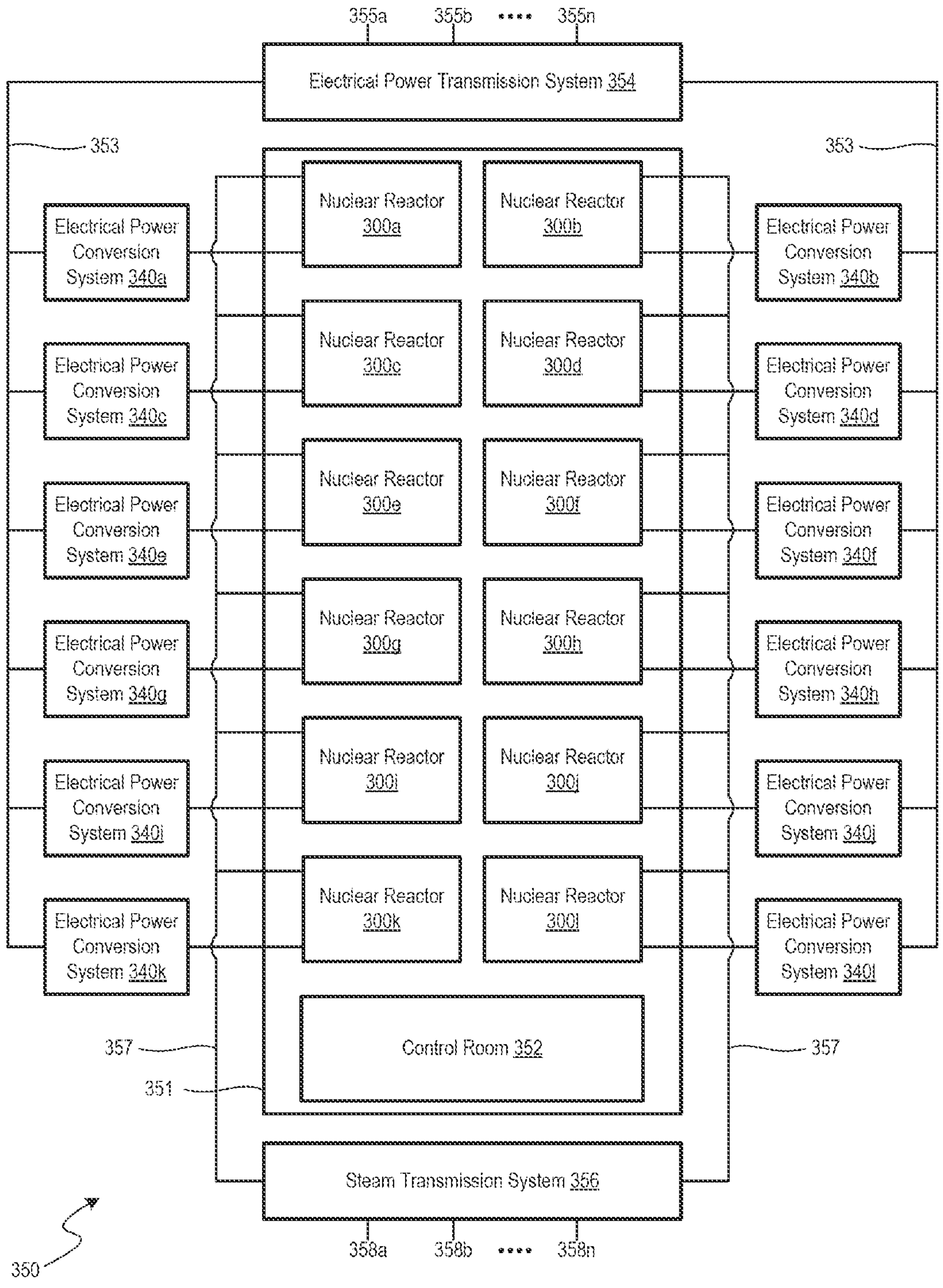
FIG. 3 is a schematic view of a nuclear power plant system including multiple small modular reactor systems in accordance with embodiments of the present technology.

FIG. 3 is a schematic view of a nuclear power plant system 350 ("power plant system 350") including multiple nuclear reactors 300 (individually identified as first through twelfth nuclear reactors 300*a*-1, respectively) in accordance with embodiments of the present technology. Each of the nuclear reactors 300 can be similar to or identical to the nuclear reactor 100 and/or the nuclear reactor 200 described in detail above with reference to FIGS. 1 and 2. The power plant system 350 can be "modular" in that each of the nuclear reactors 300 can be operated separately to provide an output, such as electricity or steam. The power plant system 350 can include fewer than twelve of the nuclear reactors 300 (e.g., two, three, four, five, six, seven, eight, nine, ten, or eleven of the nuclear reactors 300), or more than twelve of the nuclear reactors 300. The power plant system 350 can be a permanent installation or can be mobile (e.g., mounted on a truck, tractor, mobile platform, and/or the like). In the illustrated embodiment, each of the nuclear reactors 300 can be positioned within a common housing 351, such as a reactor plant building, and controlled and/or monitored via a control room 352.

Each of the nuclear reactors 300 can be coupled to a corresponding electrical power conversion system 340 (individually identified as first through twelfth electrical power conversion systems 340*a-l*, respectively). The electrical power conversion systems 340 can include one or more devices that generate electrical power or some other form of usable power from steam generated by the nuclear reactors 300. For example, the electrical power conversion systems 340 can include features that are similar or identical to the power conversion system 140 described in detail above with reference to FIG. 1. In some embodiments, multiple ones of the nuclear reactors 300 can be coupled to the same one of the electrical power conversion systems 340 and/or one or more of the nuclear reactors 300 can be coupled to multiple ones of the electrical power conversion systems 340 such that there is not a one-to-one correspondence between the nuclear reactors 300 and the electrical power conversion systems 340.

The electrical power conversion systems 340 can be further coupled to an electrical power transmission system 354 via, for example, an electrical power bus 353. The electrical power transmission system 354 and/or the electrical power bus 353 can include one or more transmission lines, transformers, and/or the like for regulating the current, voltage, and/or other characteristic(s) of the electricity generated by the electrical power conversion systems 340. The electrical power transmission system 354 can route electricity via a plurality of electrical output paths 355 (individually identified as electrical output paths 355*a-n*) to one or more end users and/or end uses, such as different electrical loads of an integrated energy system as described in greater detail below with reference to FIGS. 4-9.

Each of the nuclear reactors 300 can further be coupled to a steam transmission system 356 via, for example, a steam bus 357. The steam bus 357 can route steam generated from the nuclear reactors 300 to the steam transmission system 356 which in turn can route the steam via a plurality of steam output paths 358 (individually identified as steam output paths 358*a-n*) to one or more end users and/or end uses, such as different steam inputs of an integrated energy system as described in greater detail below with reference to FIGS. 4-9.

In some embodiments, the nuclear reactors 300 can be individually controlled (e.g., via the control room 352) to provide steam to the steam transmission system 356 and/or steam to the corresponding one of the electrical power conversion systems 340 to provide electricity to the electrical power transmission system 354. In some embodiments, the nuclear reactors 300 are configured to provide steam either to the steam bus 357 or to the corresponding one of the electrical power conversion systems 340, and can be rapidly and efficiently switched between providing steam to either. Accordingly, in some aspects of the present technology the nuclear reactors 300 can be modularly and flexibly controlled such that the power plant system 350 can provide differing levels/amounts of electricity via the electrical power transmission system 354 and/or steam via the steam transmission system 356. For example, where the power plant system 350 is used to provide electricity and steam to one or more industrial process-such as various components of the integrated energy systems described in the detail below with reference to FIGS. 4-9—the nuclear reactors 300 can be controlled to meet the differing electricity and steam requirements of the industrial processes.

As one example, during a first operational state of an integrated energy system employing the power plant system 350, a first subset of the nuclear reactors 300 (e.g., the first through sixth nuclear reactors 300*a-f*) can be configured to provide steam to the steam transmission system 356 for use in the first operational state of the integrated energy system, while a second subset of the nuclear reactors 300 (e.g., the seventh through twelfth nuclear reactors 300*g*-1) can be configured to provide steam to the corresponding ones of the electrical power conversion systems 340 (e.g., the seventh through twelfth electrical power conversion systems 340*g*-1) to generate electricity for the first operational state of the integrated energy system. Then, during a second operational state of the integrated energy system when a different (e.g., greater or lesser) amount of steam and/or electricity is required, some or all the first subset of the nuclear reactors 300 can be switched to provide steam to the corresponding ones of the electrical power conversion systems 340 (e.g., the seventh through twelfth electrical power conversion systems 340*g*-1) and/or some or all of the second subset of the nuclear reactors 300 can be switched to provide steam to the steam transmission system 356 to vary the amount of steam and electricity produced to match the requirements/demands of the second operational state. Other variations of steam and electricity generation are possible based on the needs of the integrated energy system. That is, the nuclear reactors 300 can be dynamically/flexibly controlled during other operational states of an integrated energy system to meet the steam and electricity requirements of the operational state.

In contrast, some conventional nuclear power plant systems can typically generate either steam or electricity for output, and cannot be modularly controlled to provide varying levels of steam and electricity for output. Moreover, it is typically difficult (e.g., expensive, time consuming, etc.) to switch between steam generation and electricity generation in conventional nuclear power plant systems. Specifically, for example, it is typically extremely time consuming to switch between steam generation and electricity generation in prototypical large nuclear power plant systems.

The nuclear reactors 300 can be individually controlled via one or more operators and/or via a computer system. Accordingly, many embodiments of the technology described herein may take the form of computer- or machine- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palmtop computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

II. Select Embodiments of Integrated Energy Systems

The power plant system 350 of FIG. 3 can be coupled to one or more industrial processes and/or systems to form an integrated energy system for producing green (e.g., carbon-free or reduced-carbon) industrial products such as hydrogen, oxygen, nitrogen, ammonia, sulfuric acid, methanol, urea, and/or the like (which can be referred to as "green products"). Such an integrated energy system can drastically reduce or even eliminate carbon dioxide ($CO_2$) emissions compared to conventional systems and processes for producing industrial products. In some embodiments, an integrated energy system in accordance with the present technology can produce carbon-free hydrogen, nitrogen, oxygen, electric power, and process heat (e.g., steam) as individual commodities or as feedstock or an energy source for other systems to produce other industrial products. In some embodiments, the power plant system 350 can flexibly deliver electric power and steam to one or more of a direct air capture (DAC) system for producing $CO_2$, a high and/or low temperature electrolysis system for producing hydrogen, a desalination system for producing desalinated water, a water purification system for producing clean water, a reversible solid oxide fuel cell system for producing electricity using hydrogen, and/or the like.

Figure 4:
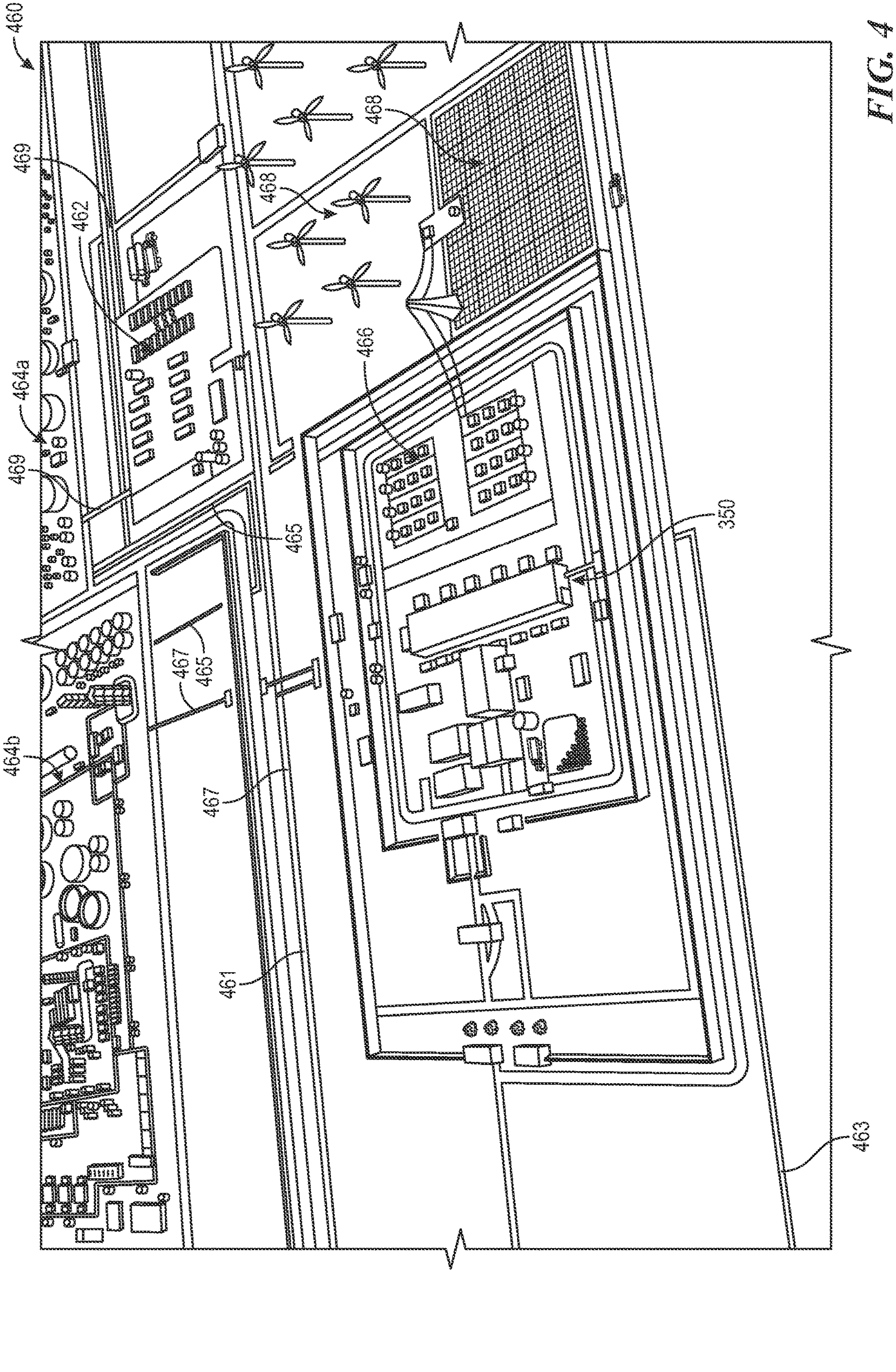
FIG. 4 is a perspective view of an integrated energy system including the power plant system of FIG. 3 in accordance with embodiments of the present technology.

FIG. 4 is a perspective view of an integrated energy system 460 including the power plant system 350 of FIG. 3 in accordance with embodiments of the present technology. In the illustrated embodiment, the power plant system 350 is configured for use in an industrial process/operation and, more particularly, for use in producing hydrogen and oxygen. The power plant system 350 can be located at or near the location of a hydrogen and oxygen production plant 462 and one or more industrial process plants 464 (including an individually identified first industrial process plant 464*a* and a second industrial process plant 464*b*). The other industrial process plants 464 can (i) carry out clean energy processes such as direct air capture (DAC) processes, (ii) produce methanol, ammonia, urea, and/or other industrial chemicals, (iii) refine oil, (iv) produce steel, fertilizer, textiles, pharmaceuticals, explosives, and/or other industrial products, and/or (v) carry out other process and produce other outputs. Several embodiments of such industrial process plants 464 are described in further detail below with reference to FIGS. 5-9.

The power plant system 350 can be a permanent or temporary installation built at or near the location of the hydrogen and oxygen production plant 462 and the industrial process plants 464, or can be a mobile or partially mobile system that is moved to and assembled at or near the location of the hydrogen and oxygen production plant 462 and the industrial process plants 464. More generally, the power plant system 350 can be local (e.g., positioned at or near) the industrial processes/operations it supports. For example, the power plant system 350 can be located within 0.4 km (0.25 mile), within 0.8 km (0.5 mile), within 3.22 km (2 miles), within 4.82 km (3 miles), or within 8.1 km (5 miles) of the industrial processes/operations it supports. In some embodiments, the power plant system 350 includes four, six, twelve, or a different number of the nuclear reactors 300 (FIG. 3) and has a power output of between 300-1000 megawatts electrical (MWe). In some embodiments, the power plant system 350 can output between about 200-600 MWe and between about 1000-3000 megawatts thermal (MWt).

In the illustrated embodiment, the power plant system 350 receives water via an intake water line 461 and discharges water used for auxiliary cooling via a discharge water line 463. The intake water line 461 and the discharge water line 463 can be overground and/or underground pipes. The power plant system 350 can also be electrically coupled to an electrical switchyard 466 (which may form all or a portion of the electrical power transmission system 354 described in detail with reference to FIG. 3) configured to distribute electricity generated by the power plant system 350 via respective power lines 465 (e.g., overhead and/or underground power lines) to (i) the hydrogen and oxygen production plant 462, (ii) one or more of the industrial process plants 464, (iii) an electrical power grid (not shown), and/or (iv) other end uses. In some embodiments, the electrical switchyard 466 further receives and routes electrical power generated by one or more renewable energy sources 468, such as windmills, solar panels, and/or the like. In the illustrated embodiment, the renewable energy sources 468 can be local to the power plant system 350, the hydrogen and oxygen production plant 462, and/or the industrial process plants 464. In other embodiments, the renewable energy sources 468 can be remote from one or more of the components of the integrated energy system 460.

In the illustrated embodiment, the power plant system 350 is further configured to route steam (e.g., process heat) to the hydrogen and oxygen production plant 462 and to the industrial process plants 464 via respective steam lines 467. The steam lines 467 can be overhead and/or underground pipes. The steam lines 467 can form all or a portion of the steam transmission system 356 described in detail with reference to FIG. 3.

The hydrogen and oxygen production plant 462 is configured to utilize the steam and electricity received from the power plant system 350 to generate hydrogen and oxygen. For example, as described in greater detail below with reference to FIG. 5, the hydrogen and oxygen production plant 462 can carry out a water electrolysis process to produce hydrogen ($H_2$) and oxygen ($1/2O_2$) using a high temperature steam electrolysis (HTSE) process, solid oxide electrolysis process, alkaline water electrolysis process, proton exchange membrane (PEM) water electrolysis process, and/or the like. The produced hydrogen and oxygen can be (i) stored on site (e.g., in pressurized containers), (ii) shipped (e.g., via truck, train, and/or the like) from the hydrogen and oxygen production plant 462 to one or more end uses, and/or (iii) routed to one or more of the industrial process plants 464 and/or other end uses via respective hydrogen and/or oxygen lines 469. The hydrogen and/or oxygen lines 469 can be overhead and/or underground pipes. In some embodiments, the hydrogen and oxygen production plant 462 can generate between 1000-5000 metric tons (MT) of $O_2$ per day and between 100-500 MT of $H_2$ per day.

Over the course of operation, the steam and/or electricity requirements of the integrated energy system 460 can vary. For example, the hydrogen and oxygen production plant 462 can require more or less steam and/or electricity based on the current demand for hydrogen and oxygen. Likewise, the industrial process plants 464 may require more or less steam and/or electricity based on the demand for industrial products produced by the industrial process plants 464. Moreover, the hydrogen and oxygen production plant 462 and/or the industrial process plants 464 may be periodically taken offline for service, maintenance, inspection, and/or the like—at which time they will require little or no input steam and electricity. Further, the renewable energy sources 468 may provide only intermittent and/or variable electricity to the electrical switchyard 466 based on current weather conditions (e.g., wind speed for windmills, available sunlight for solar panels).

Accordingly, in some aspects of the present technology the power plant system 350 can be controlled to selectively provide electricity and steam to the various components of the integrated energy system 460 based on (i) the current demands of the components for steam and electricity and/or (ii) the current demands of components external to the integrated energy system 460 (e.g., an electrical power grid). For example, referring to FIGS. 3 and 4, in a first operating state of the integrated energy system 460 having first steam and electricity requirements, a first subset of the nuclear reactors 300 can be configured to provide steam to the steam transmission system 356 for routing to the hydrogen and oxygen production plant 462 and/or the industrial process plants 464, while a second subset of the nuclear reactors 300 can be configured to provide steam to the corresponding ones of the electrical power conversion systems 340 to generate electricity for distribution by the electrical switchyard 466 to the hydrogen and oxygen production plant 462, the industrial process plants 464, and/or other end uses (e.g., the electrical power grid). Then, during a second operating state of the integrated energy system 460 having second steam and electricity requirements different from the first steam and electricity requirements, some of the nuclear reactors 300 in the first subset and/or the second subset can be flexibly/dynamically reconfigured (e.g., switched) to alternately provide steam or electricity to alter the overall thermal and electrical outputs of the power plant system 350 to better match the demands of the integrated energy system 460. That is, a number of the nuclear reactors 300 in the first subset and a number of the nuclear reactors 300 in the second subset can be different in the different first and second operating states. Accordingly, the modularity of the nuclear reactors 300 allows the power plant system 350 to flexibly/dynamically switch the output of electricity and steam from individual ones of the nuclear reactors 300 based on the demands of the integrated energy system 460.

Referring again to FIG. 4, in additional aspects of the present technology the steam generated by the power plant system 350 is directly routed to the hydrogen and oxygen production plant 462 and the industrial process plants 464 without much energy loss. In contrast, for example, industrial process plants typically utilize electricity to run a steam generator to generate steam. Such conventional operations are less efficient than the present technology because energy is lost during the extra step of converting electricity to steam. That is, the present technology directly generates steam for use in industrial processes rather than, for example, generating steam for input to an electrical power conversion system that generates electricity that is then used to run a steam generator to generate steam. Moreover, the hydrogen and oxygen produced by the hydrogen and oxygen production plant 462 can be directly routed to the local industrial process plants 464 via the hydrogen and/or oxygen lines 469 without requiring separate transportation via truck or long distance pipelines.

Figure 5:
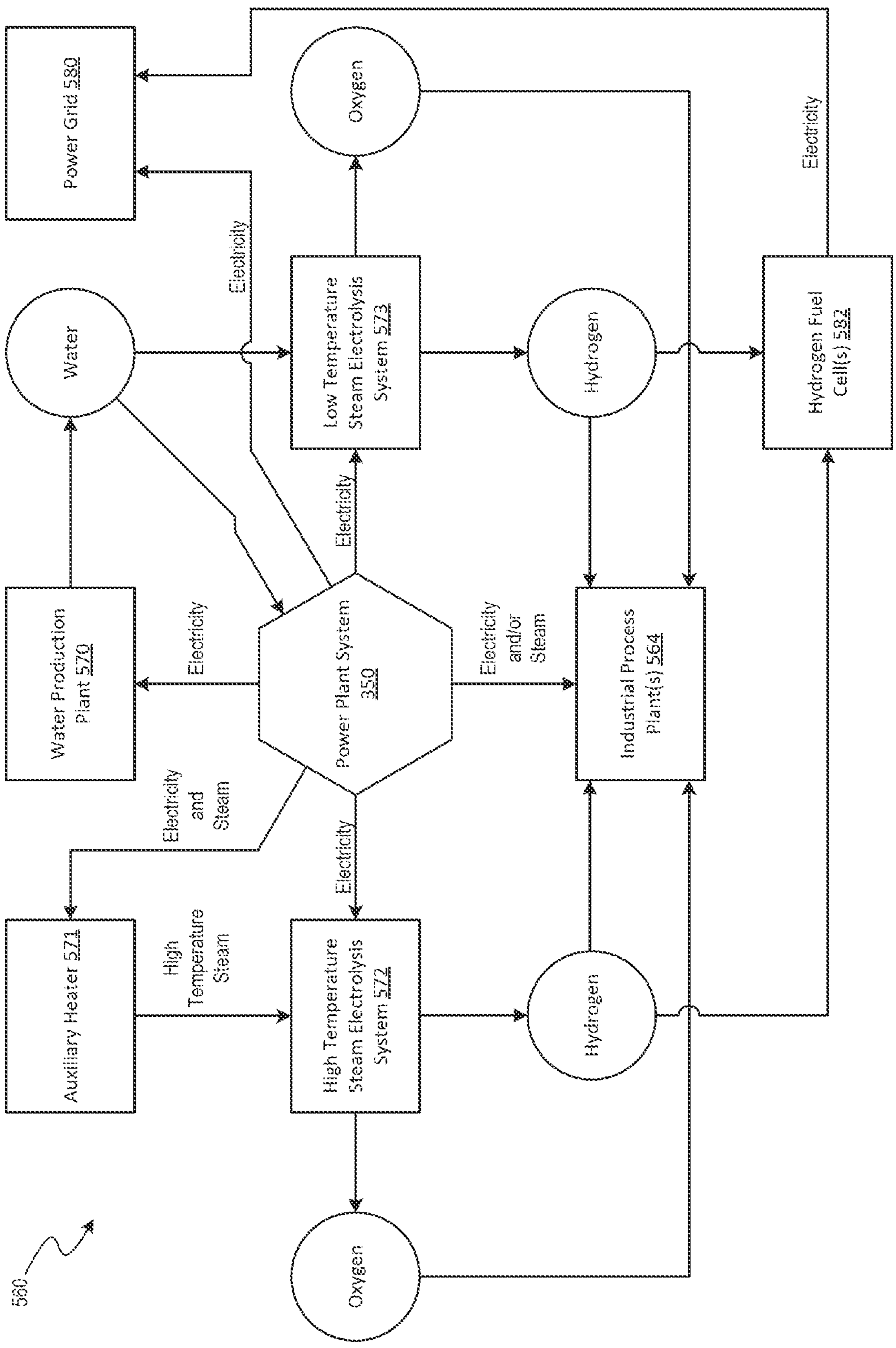
FIG. 5 is a schematic diagram of an integrated energy system including the power plant system of FIG. 3 in accordance with additional embodiments of the present technology.

FIG. 5 is a schematic diagram of an integrated energy system 560 including the power plant system 350 of FIG. 3, configured in accordance with additional embodiments of the present technology. The integrated energy system 560 can include some features that are at least generally similar in structure and function, or identical in structure and function, to the corresponding features of the integrated energy system 460 described in detail above with reference to FIG. 4, and can operate in a generally similar or identical manner to the integrated energy system 460.

In the illustrated embodiment, the integrated energy system 560 is configured to generate hydrogen and oxygen for use in industrial processes. Specially, the power plant system 350 generates electricity and routes the electricity (e.g., via one or more power lines, via the electrical power transmission system 354 of FIG. 3) to a water production plant 570, an auxiliary heater 571, a high temperature steam electrolysis (HTSE) system 562, a low temperature steam electrolysis (LTSE) system 573, and one or more industrial process plants 564. In some embodiments, the power plant system 350 can further route electricity (e.g., excess electricity) to a power grid 580. The power grid 580 can supply power to a plurality of remote end users, or can be dedicated to a specific consumer. The power plant system 350 further generates steam and routes the steam (e.g., via one or more steam transmission lines, via the steam transmission system 356 of FIG. 3) to the auxiliary heater 571 and/or to the industrial process plant 564.

The water production plant 571 can be a water treatment plant, a desalination plant, and/or the like and is configured to produce high-quality water. For example, the water production plant 571 can operate to demineralize and/or otherwise remove contaminants and/or unwanted material from a water source. The water production plant 571 is configured to route (e.g., via one or more pipes) the produced high-quality water to the LTSE system 573. In some embodiments, the water production plant 571 can route the produced high-quality water to the power plant system 350, and the power plant system 350 can use the water to produce high-quality steam. For example, the produced water can be used as a secondary coolant in a steam generator of one or more of the nuclear reactors 300. In other embodiments, the power plant system 350 can utilize water from other sources to generate steam.

The auxiliary heater 571 can convert the electricity from the power plant system 350 to heat to superheat the steam from the power plant system 350 (e.g., to between 300-850° C., to between 700-850° C., to above 600° C., to 850° C., to above 850° C.) and route the superheated steam to the HTSE system 572. For example, the auxiliary heater 571 can comprise one or more resistance heaters. In some embodiments, the steam leaving the power plant system 350 and fed into the auxiliary heater 571 is about 300° C. The HTSE system 572 and the LTSE system 573 can be part of the same hydrogen and oxygen production plant (e.g., the hydrogen and oxygen production plant 462 of FIG. 4), or can be incorporated into separate plants.

The HTSE system 572 can use the electricity from the power plant system 350 to operate an HTSE process to separate the high temperature steam from the auxiliary heater 571 into hydrogen and oxygen. More specifically, the HTSE system 572 can comprise a plurality of HTSE cells including a cathode and an anode separated by an electrolyte. An electric field generated between the cathode and the anode can cause steam flowing near the cathode to dissociate into hydrogen and oxygen, with the oxygen flowing toward the anode. In some aspects of the present technology, superheating the steam fed into the HTSE system 572 with the auxiliary heater 571 can improve the efficiency of the HTSE process, as the HTSE process can be most efficient when the input steam temperature is operated in a temperature range of greater than 700° C. (e.g., between about 700-850° C.). The HTSE system 572 can be suitable for constant hydrogen production.

The LTSE system 573 can use the electricity from the power plant system 350 to operate an LTSE process to separate the water from the water production plant 570 into hydrogen and oxygen. Accordingly, although referred to as a low temperature steam electrolysis system, the LTSE 573 may carry out electrolysis on water in liquid form. More specifically, the LTSE system 573 can implement a liquid alkaline (LA) electrolysis process and/or a proton-exchange membrane (PEM) electrolysis process. For example, the LTSE system 573 can comprise a plurality of LTSE fuel cells including a cathode and an anode separated by a proton exchange membrane. An electric field generated between the cathode and the anode can cause water flowing near the anode to dissociate into hydrogen and oxygen, with the hydrogen flowing toward the anode.

In some aspects of the present technology, the HTSE system 572 can be more efficient than the LTSE system 573. However, the LTSE system 573 can have a more compact design, can work with lower temperature input water (e.g., less than 100° C., room temperature), can be less susceptible to water quality characteristics, and/or can require less frequent maintenance (e.g., changing, replacement) of the electrolysis cells. Accordingly, including both the HTSE system 572 and the LTSE system 573 can provide redundancy that can improve the overall reliability of hydrogen and oxygen production. In some embodiments, the power plant system 350 can be controlled to selectively provide electricity, steam, and/or water to the HTSE system 572 and the LTSE system 573. For example, during normal operation, more electricity and steam can be routed to the auxiliary heater 571 and the HTSE system 572 to increase the output of the HTSE system 572 to capitalize on its higher efficiency, while excess electricity can be used to operate the LTSE system 573 for supplemental hydrogen and oxygen production. Then, during servicing, maintenance, or other operations on the HTSE system 572, more the electricity can be routed to the LTSE system 573 to generate hydrogen and oxygen during a period when the HTSE system 572 would otherwise be fully or partially offline. For example, some of nuclear reactors 300 (FIG. 3) of the power plant system 350 can be dynamically switched from producing steam for use in the HTSE system 572 to producing electricity for use in the LTSE system 573 to increase the hydrogen and oxygen output of the LTSE system 573. Similarly, any excess energy can be used to produce electricity for transmission to the power grid 580. Accordingly, the modularity of the nuclear reactors 300 allows the power plant system 350 to flexibly/dynamically switch the output of electricity and steam from individual ones of the nuclear reactors 300 based on the operating states of the HTSE system 572 and the LTSE system 573, and/or other demands of the integrated energy system 560.

Additionally, one or more of the nuclear reactors 300 can be individually taken offline for servicing, maintenance, refueling, etc., while the remainder of the nuclear reactors 300 can continue to produce steam and/or electricity. Accordingly, the power plant system 350 can continue to provide steam and electricity to the HTSE system 572 and/or the LTSE system 573 for hydrogen production even during servicing, maintenance, refueling, etc. In contrast, conventional nuclear reactor systems must be entirely shut down during such procedures such that neither steam nor electricity are available.

The produced hydrogen and oxygen can be routed to one or more industrial process plants 564 that can, for example, be co-located with the power plant system 350, the water production plant 570, the auxiliary heater 571, the HTSE system 572, and/or the LTSE system 573. For example, the produced hydrogen can be transported (e.g., fed) directly into oil refineries for desulfurization of natural gas, diesel, and crude oil, and also can be used to make ammonia via the Haber-Bosch process, as described in detail below with reference to FIGS. 5-9. The oxygen can be used in a basic oxygen steel-making (BOS) process to produce high-quality steel, can be packaged/contained for use in medical applications, and/or can be used in other applications.

In some embodiments, the integrated energy system 560 further includes one or more hydrogen fuel cells 582 operably coupled to the HTSE system 572 and/or the LTSE system 573 for receiving hydrogen therefrom. The hydrogen fuel cell 582 can convert the hydrogen to electricity for routing to the power grid 580 and/or another component of the integrated energy system 560. The hydrogen fuel cell 582 can be a solid oxide fuel cell (SOFC) or a reversible solid oxide fuel cell (RSOFC) that uses an electrochemical process to convert hydrogen into electricity. In some embodiments, the integrated energy system 560 can route excess hydrogen produced by the HTSE system 572 and/or the LTSE system 573 to the hydrogen fuel cell 582. The integrated energy system 560 can produce excess hydrogen when the hydrogen demands of the industrial process plant 564 are reduced such as, for example, when the industrial process plant 564 undergoes servicing, maintenance, etc.

In some embodiments, the integrated energy system 560 can further include one or more hydrogen and/or oxygen storage facilities (not shown) for storing hydrogen and/or oxygen produced by the HTSE system 572 and/or the LTSE system 573. The stored hydrogen and/or oxygen can be routed to the industrial process plant 564, the hydrogen fuel cell 582, and/or other end uses when, for example, demand for hydrogen and/or oxygen exceeds the output of the HTSE system 572 and the LTSE system 573.

In some aspects of the present technology, the integrated energy system 560 can be highly efficient and produce little or no carbon emissions. In contrast, conventional systems for producing hydrogen and oxygen generally rely on steam-methane reforming which reacts natural gas with steam at elevated temperature to produce carbon monoxide and hydrogen. Steam-methane reforming has significant carbon emissions—generally producing about 9.3 kilograms (kg) of carbon dioxide per kg of hydrogen produced.

Figure 6:
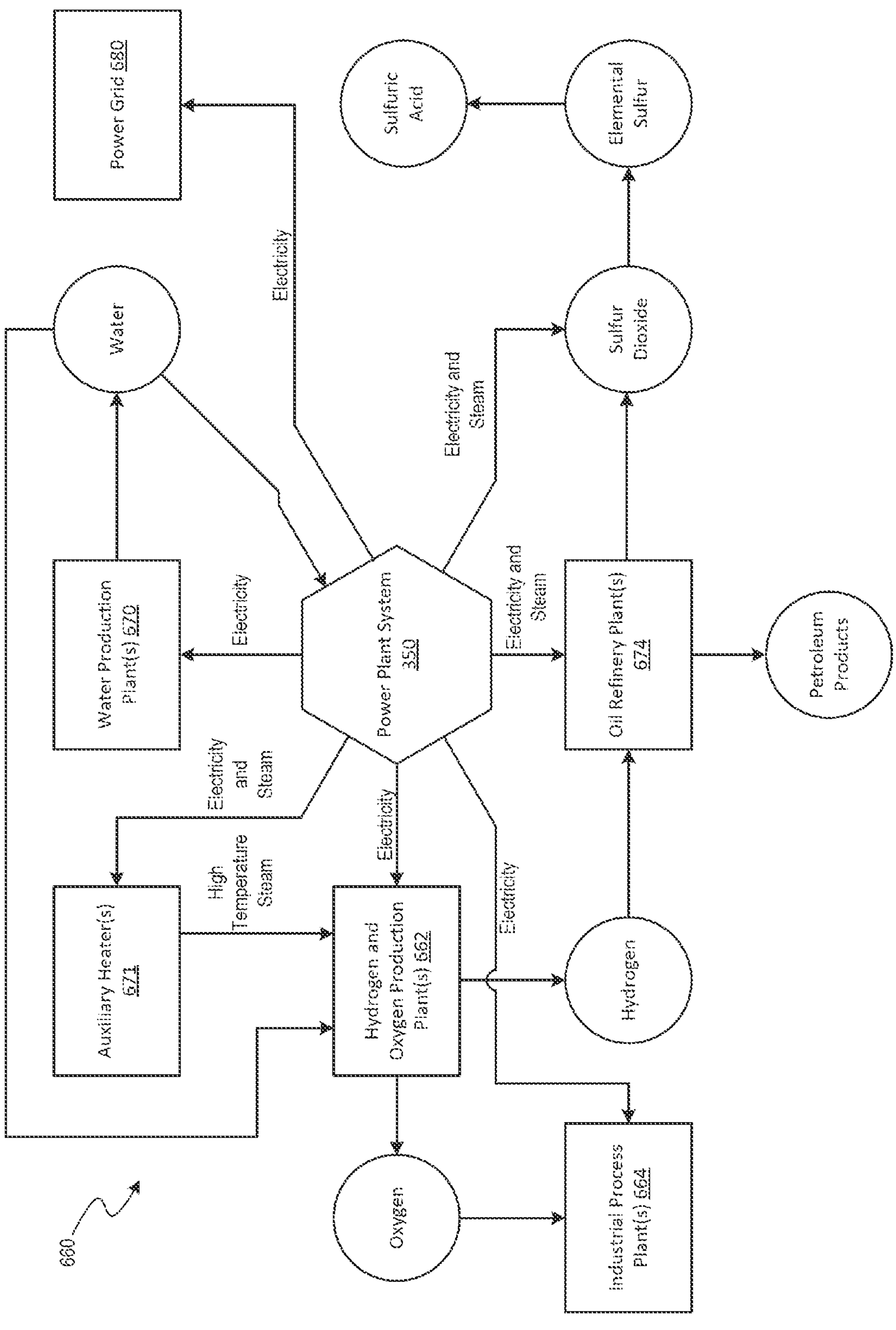
FIG. 6 is a schematic diagram of an integrated energy system including the power plant system of FIG. 3 in accordance with additional embodiments of the present technology.

FIG. 6 is a schematic diagram of an integrated energy system 660 including the power plant system 350 of FIG. 3 in accordance with additional embodiments of the present technology. The integrated energy system 660 can include some features that are at least generally similar in structure and function, or identical in structure and function, to the corresponding features of the integrated energy system 460 and/or the integrated energy system 560 described in detail above with reference to FIGS. 4 and 5, and can operate in a generally similar or identical manner to the integrated energy system 460 and/or the integrated energy system 560.

In the illustrated embodiment, the integrated energy system 660 is configured to produce hydrogen for use in oil refining processes. Specifically, the power plant system 350 generates electricity and routes the electricity to one or more water production plants 670, one or more auxiliary heaters 671, one or more hydrogen and oxygen production plants 662, one or more oil refinery plants 674, and one or more industrial process plants 664. In some embodiments, the power plant system 350 can further route electricity (e.g., excess electricity) to a power grid 680. The power plant system 350 further generates steam and routes the steam to the auxiliary heater 671 and the oil refinery plant 674. The water production plant 670 is configured to produce high-quality water and route the produced high-quality water to the hydrogen and oxygen production plant 662 and the power plant system 350, which can use the water to produce high-quality steam. The hydrogen and oxygen production plant 662 can (i) utilize high-quality and high-temperature steam generated by the auxiliary heater 671 to generate hydrogen and oxygen using an HTSE process and/or (ii) utilize high-quality water generated by the water production plant 670 to generate hydrogen and oxygen using an LTSE process, both as described above in detail above with reference to FIG. 5.

The oil refinery plant 674 can transform and refine petroleum (e.g., crude oil) into useful products such as gasoline (e.g., petrol), diesel fuel, asphalt base, fuel oils, heating oil, kerosene, liquefied petroleum gas, petroleum naphtha, and/or the like. More specifically, the oil refinery plant 674 can receive hydrogen produced by the hydrogen and oxygen production plant 662 and utilize the hydrogen to desulfurize (e.g., pre-reform) natural gas (e.g., diesel fuel) and/or other products to produce petroleum products. In some aspects of the present technology, the integrated energy system 660 can produce the hydrogen for desulfurization in a highly efficient manner while also producing few or no carbon emissions. In contrast, conventional systems for producing hydrogen for oil refinery desulfurization typically rely on steam-methane reforming which produces significant carbon emissions, as described in detail above.

As further shown in FIG. 6, the desulfurization process carried out by the oil refinery plant 674 can produce sulfur dioxide ($SO_2$: e.g., $SO_2$ gas). In some embodiments, the oil refinery plant 674 and/or another component of the integrated energy system 660 can recapture the produced $SO_2$ and synthesize the $SO_2$ to regenerate elemental sulfur for the subsequent production of sulfuric acid, which is a key component for many industrial processes and material production processes. More specifically, the oil refinery plant 674 can utilize electricity and steam from the power plant system 350 to recapture and synthesize the sulfur dioxide to produce elemental sulfur, and then further process the sulfur dioxide using electricity and steam from the power plant system 350 to generate sulfuric acid (e.g., using a contact process). Such processes can operate according to the following equations:

1) Recovering Sulfur $$2H_2S + 3O_2 \rightarrow 2SO_2 + 2H_2O + \text{heat}$$

$$2H_2S + 2\,SO_2 \rightarrow 2S + 2H_2O + \text{heat}$$

-continued

2) Sulfuric Acid $$S + O_2 \rightarrow SO_2$$

$$2SO_2 + O_2 \rightarrow 2SO_3$$

$$SO_3 + H_2O \rightarrow H_2SO_4$$

The sulfuric acid can be shipped or directly transported to one or more industrial processing plants for subsequent use. The industrial process plant 664 can utilize the oxygen generated by the hydrogen and oxygen production plant 662 in, for example, a basic oxygen steel-making (BOS) process to produce high-quality steel. In some embodiments, some or all of the produced oxygen can be packaged/contained for use in medical applications, and/or can be used in other industrial processes or applications.

In some aspects of the present technology, the integrated energy system 660 can highly efficiently produce hydrogen for natural gas desulfurization while producing little or no carbon emissions. In contrast, conventional systems for producing hydrogen for use in oil refineries typically rely on steam-methane reforming, which has significant carbon emissions. Moreover, the power plant system 350 can be local to the oil refinery plant 674 such that the produced hydrogen can be directly routed to the oil refinery plant 674 without the need for long-distance transportation and/or storage. In some aspects of the present technology, this can significantly reduce operational costs by reducing or even eliminating hydrogen transportation and storage costs. Specifically, hydrogen has a low density that can potentially cause embrittlement of steel such that transportation and storage costs—either through pipelines or tankers—are considerably more expensive for hydrogen than for natural gas. Moreover, the power plant system 350 can be controlled to selectively provide electricity and/or steam to the various components of the integrated energy system 660 based on their demands, operational status, and/or the like, as described in detail above. For example, excess energy can be used to produce electricity for transmission to the power grid 680 when, for example, the oil refinery plant 674 does not require significant energy inputs (e.g., during maintenance, servicing, etc.).

Figure 7:
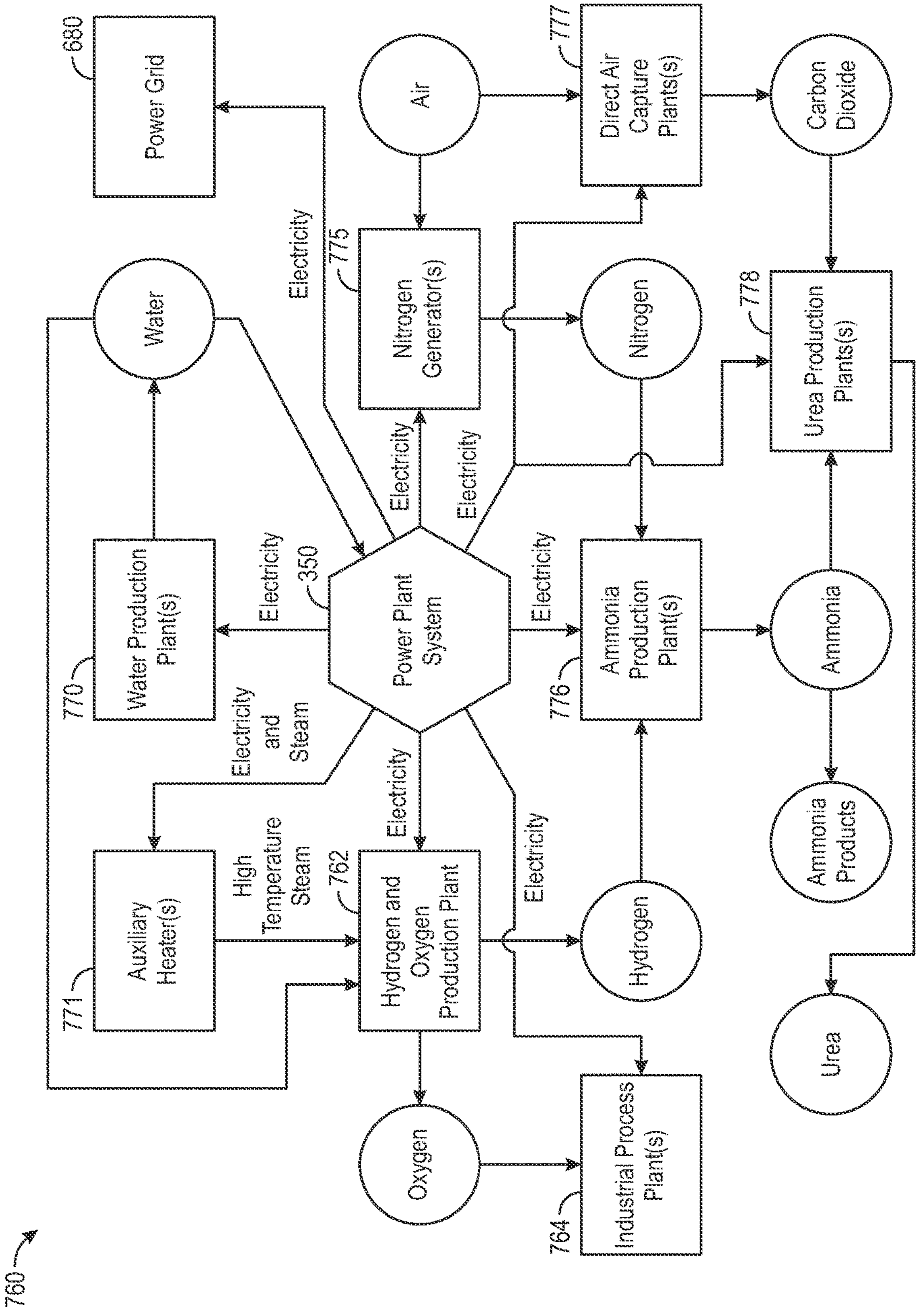
FIG. 7 is a schematic diagram of an integrated energy system including the power plant system of FIG. 3 in accordance with additional embodiments of the present technology.

FIG. 7 is a schematic diagram of an integrated energy system 660 including the power plant system 350 of FIG. 3 in accordance with additional embodiments of the present technology. The integrated energy system 760 can include some features that are at least generally similar in structure and function, or identical in structure and function, to the corresponding features of the integrated energy system 460, the integrated energy system 560, and/or the integrated energy system 660 described in detail above with reference to FIGS. 4-6, and can operate in a generally similar or identical manner to the integrated energy system 460, the integrated energy system 560, and/or the integrated energy system 560.

In the illustrated embodiment, the integrated energy system 660 is configured to produce hydrogen, nitrogen, and carbon dioxide for use in producing ammonia and urea. Specifically, the power plant system 350 generates electricity and routes the electricity to one or more water production plants 770, one or more auxiliary heaters 771, one or more hydrogen and oxygen production plants 762, one or more industrial process plants 764, one or more nitrogen generators 775, one or more ammonia production plants 776, one or more direct air capture (DAC) plants 777, and one or more urea production plants 778. In some embodiments, the power plant system 350 can further route electricity (e.g., excess electricity) to a power grid 780. The power plant system 350 further generates steam and routes the steam to the auxiliary heater 771.

As described in detail above with reference to FIGS. 5 and 6, the water production plant 770 is configured to produce high-quality water and route the produced high-quality water to the hydrogen and oxygen production plant 762 and the power plant system 350, which can use the water to produce high-quality steam. The hydrogen and oxygen production plant 762 can (i) utilize high-quality and high-temperature steam generated by the auxiliary heater 771 to generate hydrogen and oxygen using an HTSE process and/or (ii) utilize high-quality water generated by the water production plant 770 to generate hydrogen and oxygen using an LTSE process. The industrial process plant 764 can utilize the oxygen generated by the hydrogen and oxygen production plant 762 to produce high-quality steel, package oxygen for medical or other applications, and/or the like.

The nitrogen generator 775 can receive air and utilize the electricity from the power plant system 350 to separate/capture nitrogen from the air. For example, the nitrogen generator 775 can include a pressure-swing adsorption (PSA) system, membrane system, and/or cryogenic system for generating nitrogen. In general, the nitrogen generator 775 can require a significant amount of energy to operate. In some aspects of the present technology, the power plant system 350 can flexibly and reliably deliver carbon-free electricity to the nitrogen generator 775.

PSA systems can include multiple towers which are filled with a carbon molecular sieve (CMS). Compressed air enters the bottom of the towers and flows up through the CMS. Oxygen and other trace gases are preferentially adsorbed by the CMS, allowing nitrogen to pass through. After a pre-set time, the towers can automatically switch to a regenerative mode, venting contaminants from the CMS. CMS differs from ordinary activated carbons as it has a much narrower range of pore openings. This allows small molecules such as oxygen to penetrate the pores and separate from nitrogen molecules which are too large to enter the CMS. The larger nitrogen molecules by-pass the CMS and emerge as nitrogen gas.

Membrane systems are built to separate compressed air through hollow-fiber membranes. Such membrane system work by forcing compressed air into a vessel which selectively permeates oxygen, water vapor, and other impurities out of its sidewalls. Nitrogen flows through the center and emerges as gas. Membrane systems can be easier to operate and can have lower operating costs than PSA and cryogenic systems.

Cryogenic systems start by taking in atmospheric air into an air separation unit. The air is compressed in a compressor and the air components are separated by fractional distillation. Then, the air is moved through a cleanup system where impurities like hydrocarbons, moisture, and carbon dioxide are eliminated. Next, the air is directed into heat exchangers to liquefy it at cryogenic temperatures. At this stage, the air is put through a high-pressure distillation column where nitrogen is physically separated from oxygen and other gases. Nitrogen so formed is collected and put into a low-pressure distillation column where it is distilled until it meets commercial specifications.

The ammonia production plant 776 can receive hydrogen from the hydrogen and oxygen production plant 762 and nitrogen from the nitrogen generator 775 and utilize the hydrogen and nitrogen to produce ammonia. For example, the ammonia production plant 776 can carry out the Haber-Bosch process to convert the hydrogen and nitrogen to ammonia. In some embodiments, the ammonia production plant and/or another component of the integrated energy system 760 can further generate ammonia products from the ammonia, such as fertilizer, explosives, textiles, pharmaceuticals, and/or the like.

The DAC plant 777 can capture carbon dioxide ($CO_2$) by pulling in atmospheric air and then, through a series of chemical reactions, extracting the $CO_2$ from the air while returning the rest of the air to the environment. The DAC plant 777 can utilize a liquid sorbent and/or solid sorbent process. For example, a liquid sorbent DAC process can start with an air contactor. A large fan pulls air into the air contractor, where it passes over thin plastic surfaces that have potassium hydroxide solution flowing over them. This alkali solution chemically binds with the $CO_2$ molecules, removing them from the air and trapping them in the liquid solution as a carbonate salt. The $CO_2$ contained in this carbonate solution can then be put through a series of chemical processes to increase its concentration and purify and compress it, such that it can be delivered in gas form ready for use or storage. This can include separating the salt out from solution into small pellets in a pellet reactor. These pellets are then heated in a calciner to release the $CO_2$ in pure gas form. This step also leaves behind processed pellets that can be hydrated in a slaker and recycled back into the system to reproduce the original capture chemical.

In a stationary bed solid sorbent DAC process, air is pushed through a contactor unit by fans and $CO_2$ adsorbs onto the solid sorbent at ambient conditions. After the solid sorbent is saturated with $CO_2$, or has reached the desired $CO_2$ uptake, the apparatus is switched from adsorption to desorption mode. At this stage, the contactor is closed off from the surrounding environment. A vacuum pump evacuates residual air from the contactor to prevent dilution of the produced $CO_2$ by residual oxygen and nitrogen in the contactor and to minimize the solid sorbent degradation from air. Following the vacuum stage, steam is sent into the contactor to heat the material to the regeneration temperature (roughly 80-120° C.). The steam additionally flushes the released $CO_2$ from the contactors, which is then separated from water in the condenser and sent to compression for subsequent transportation, storage, or utilization.

The urea production plant 778 can receive carbon dioxide from the DAC plant 777 and ammonia from the ammonia production plant 776 and utilize the carbon dioxide and ammonia to produce urea ($NH_2COONH_4$). For example, the urea production plant 778 can feed the carbon dioxide and ammonia into a reaction chamber at high pressure and temperature to form urea in a two-step reaction:

$$2NH_3 + CO_2 \Leftrightarrow NH_2COONH_4 \text{ (Ammonium Carbamate)}$$

$$NH_2COONH_4 \Leftrightarrow H_2O + NH_2CONH_2 \text{ (Urea)}$$

The urea contains unreacted $NH_3$ and $CO_2$ and ammonium carbamate. The urea production plant 778 can reduce the pressure in the reaction chamber and apply heat to decompose the $NH_2COONH_4$ into ammonia ($NH_3$) and ($CO_2$). The ammonia and carbon dioxide can be recycled. The urea solution can then be concentrated to produce greater than 99% molten urea and granulated urea for use as, for example, a fertilizer and chemical feedstock.

In some aspects of the present technology, the integrated energy system 760 can produce ammonia and urea in a highly efficient manner while also producing few or no carbon emissions. In particular, each stage of hydrogen, nitrogen, carbon dioxide, ammonia, and urea production can be powered using electricity and/or steam from the power plant system 350 which utilizes carbon free nuclear energy. In contrast, conventional systems for producing hydrogen for ammonia production typically rely on steam-methane reforming which produces significant carbon emissions, as described in detail above. Likewise, processes to produce nitrogen for ammonia production and carbon dioxide for urea production are energy intensive, and typically rely on energy from burning fossil fuels which further produces significant carbon emissions. Accordingly, the present technology is capable of producing "green" products such as hydrogen, nitrogen, carbon dioxide, ammonia, and urea by using a sustainable nuclear energy source and green production means. Moreover, the power plant system 350 can be controlled to selectively provide electricity and/or steam to the various components of the integrated energy system 760 based on their demands, operational status, and/or the like, as described in detail above.

Figure 8:
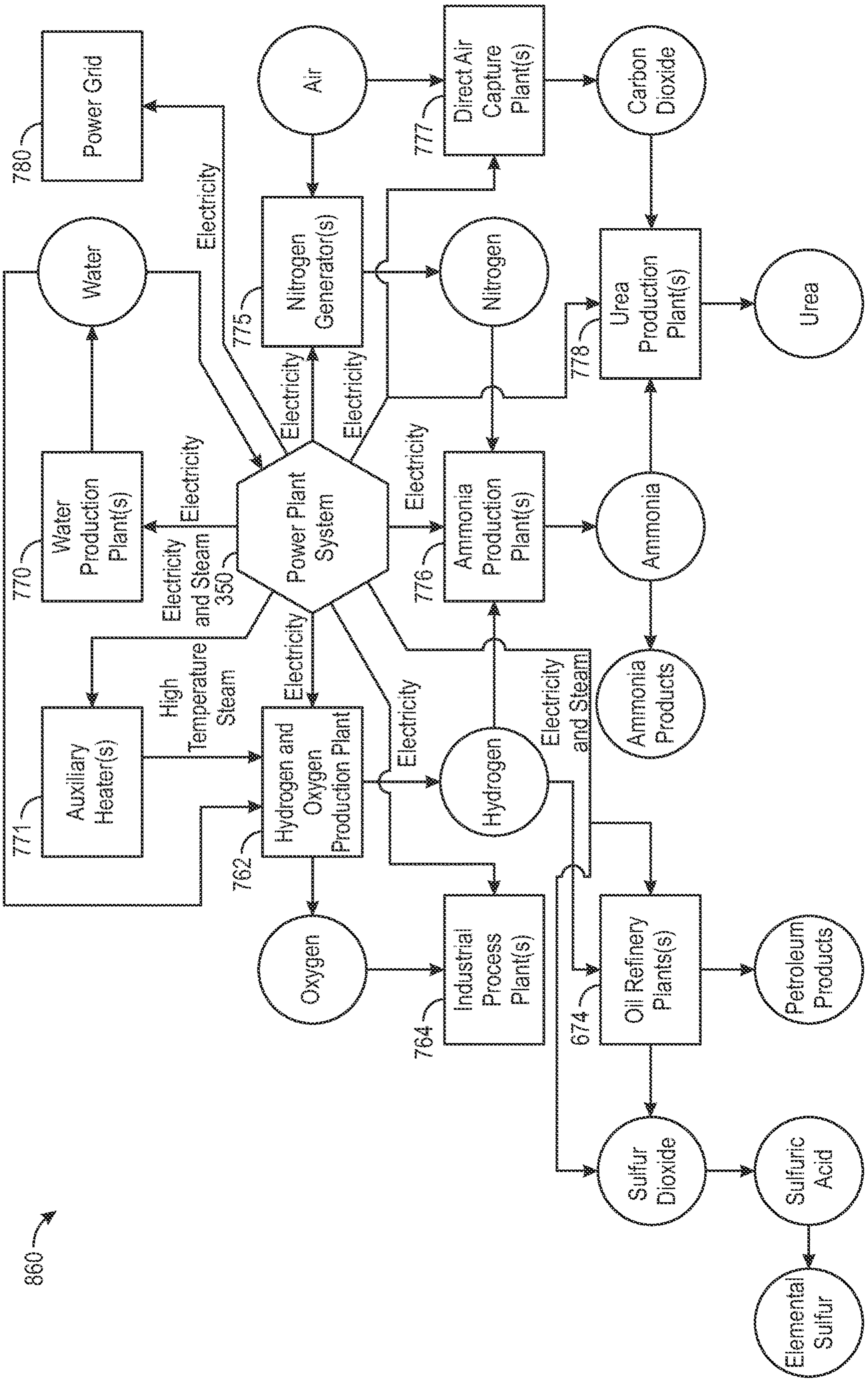
FIG. 8 is a schematic diagram of an integrated energy system 860 including the power plant system of FIG. 3 in accordance with additional embodiments of the present technology.

Referring to FIGS. 4-7, in some embodiments the various components of the integrated energy systems 460, 560, 660, and 760 can be combined or omitted, certain inputs (e.g., hydrogen, oxygen, carbon dioxide, steam, electricity, etc.) may be provided from different sources, and/or certain outputs (e.g., hydrogen, oxygen, carbon dioxide, steam, electricity, etc.) can be routed to different end uses. For example, FIG. 8 is a schematic diagram of an integrated energy system 860 including the power plant system 350 of FIG. 3 in accordance with additional embodiments of the present technology for use in refining oil as described in detail with reference to FIG. 6 and for use in producing ammonia and urea as described in detail with to FIG. 7. The various components of the integrated energy system 860 can be at least generally similar in structure and function, or identical in structure and function, to the corresponding features of the integrated energy system 660 and/or the integrated energy system 760 described in detail above with reference to FIGS. 6 and 7. In the illustrated embodiment, the power plant system 350 routes electricity and steam to the oil refinery plant 674 for production of petroleum products, sulfur dioxide, sulfuric acid, and elemental sulfur using hydrogen from the hydrogen and oxygen production plant 762, while also routing electricity to the ammonia production plant 776, the nitrogen generator 775, the DAC plant 777, and the urea production plant 778 for production of ammonia, ammonia products, and urea.

Figure 9:
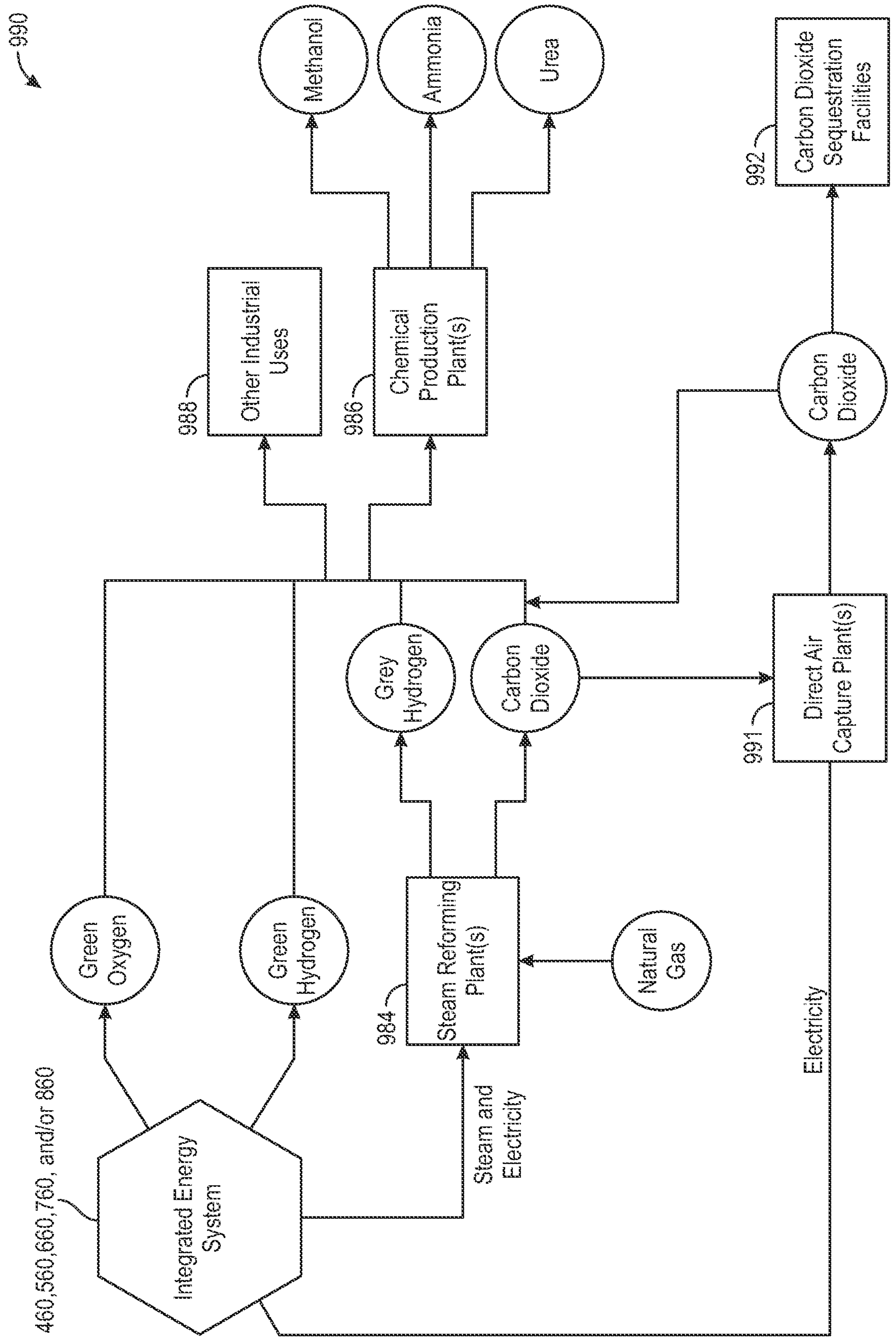
FIG. 9 is a schematic diagram of an integrated energy system including one or more of the integrated energy systems of FIGS. 4-8 operably coupled to one or more steam reforming plants in accordance with embodiments of the present technology.
Figure 10:
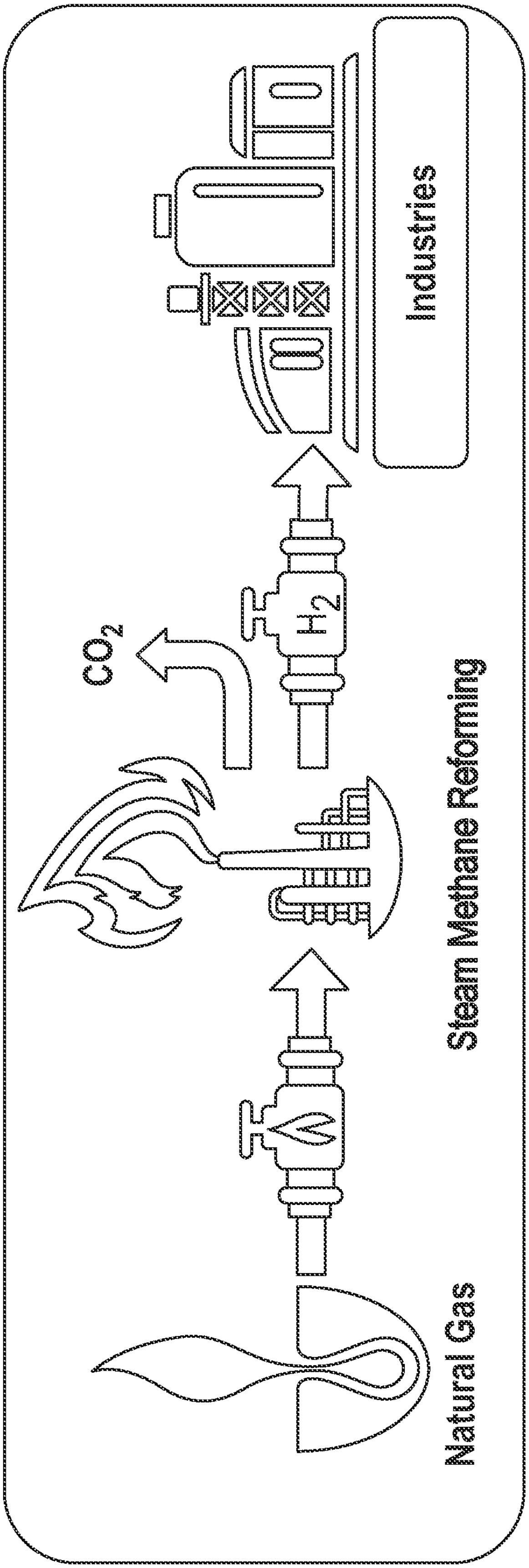
FIG. 10 (Prior Art)
FIG. 10 is a schematic diagram of a typical steam-methane reforming process.
Figure 11:
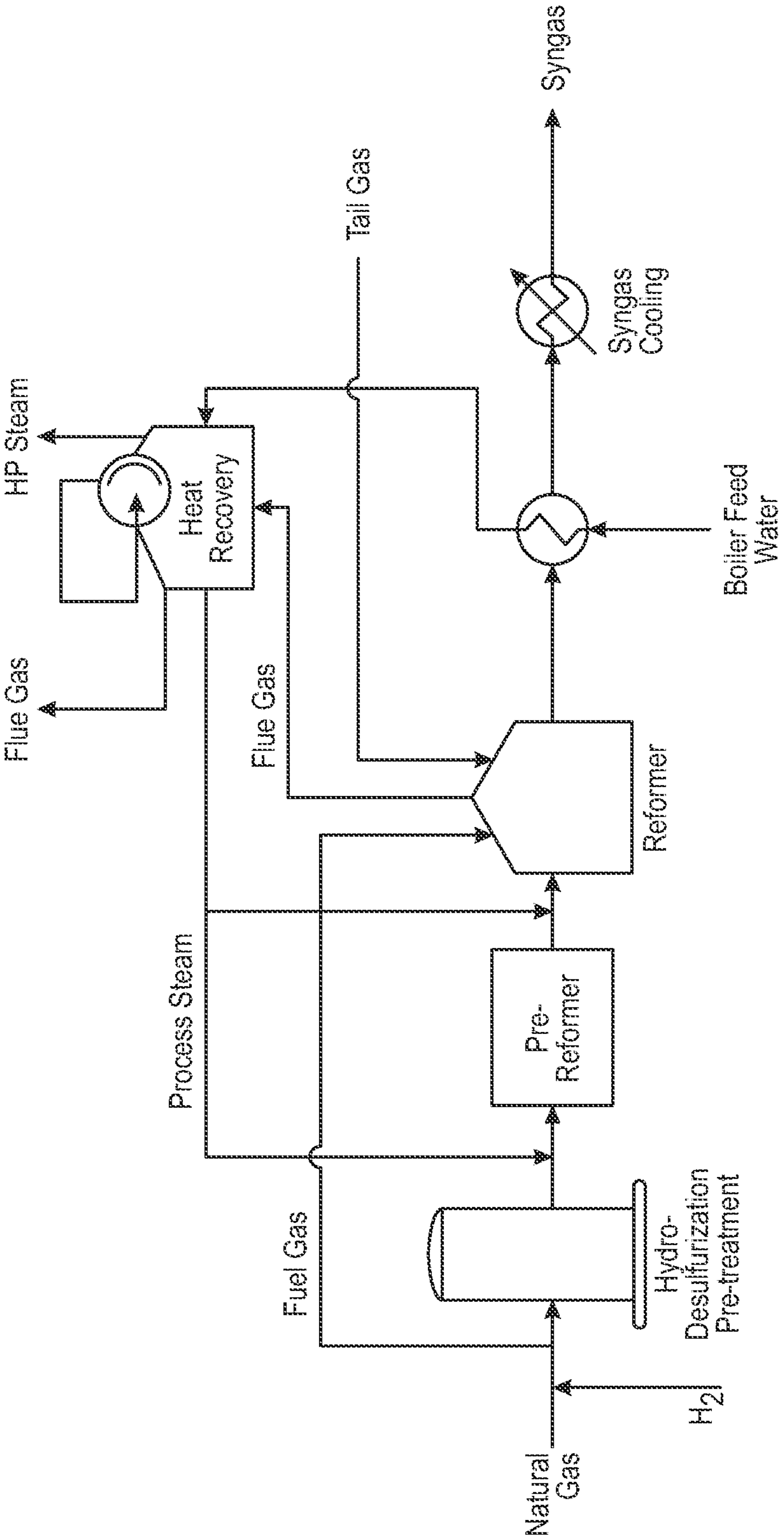
FIG. 11 (Prior Art)
FIG. 11 is a schematic diagram of a typical natural gas desulfurization process.
Figure 12:
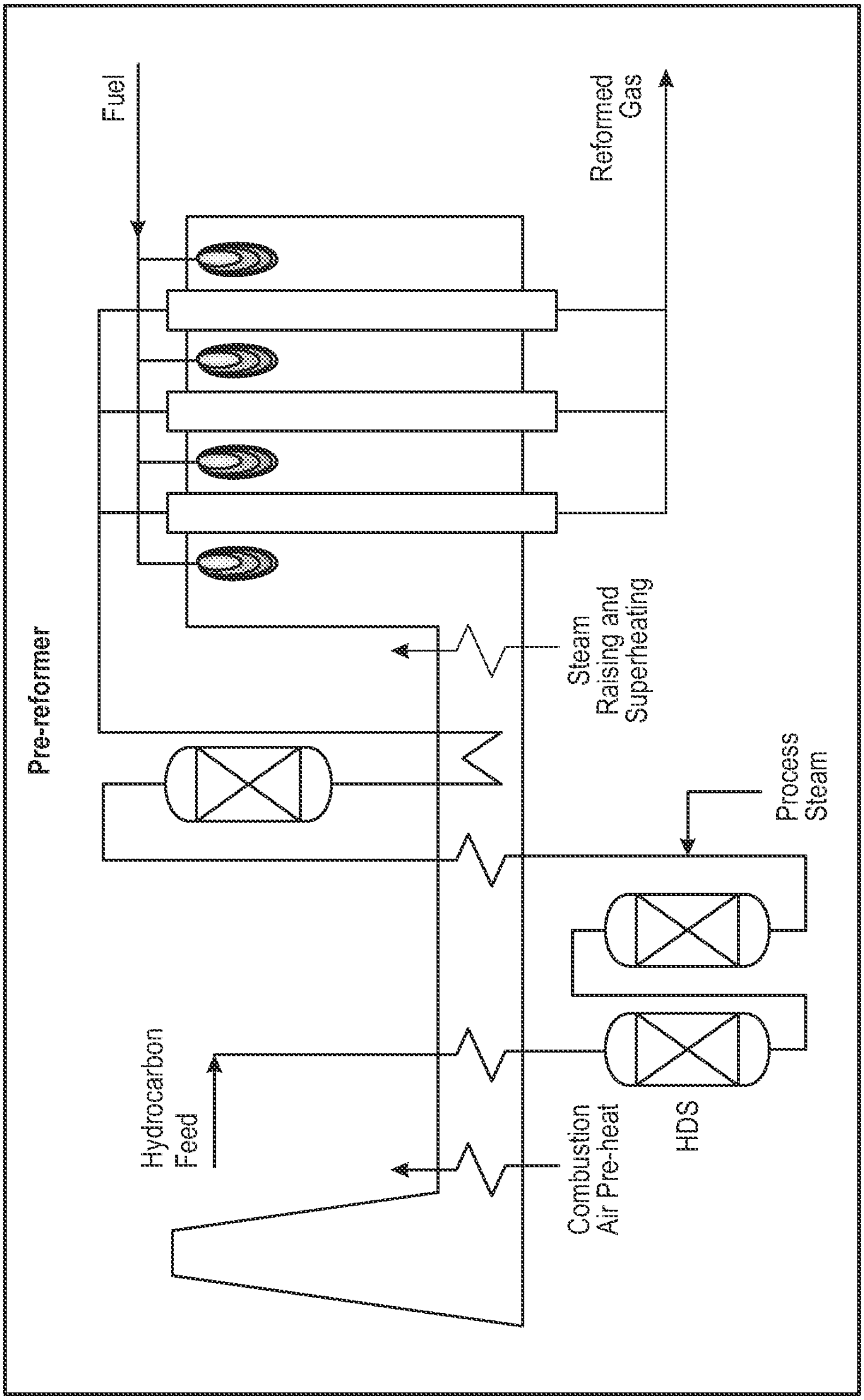
FIG. 12 (Prior Art)
FIG. 12 is a schematic diagram of a typical natural gas desulfurization process.
Figure 13:
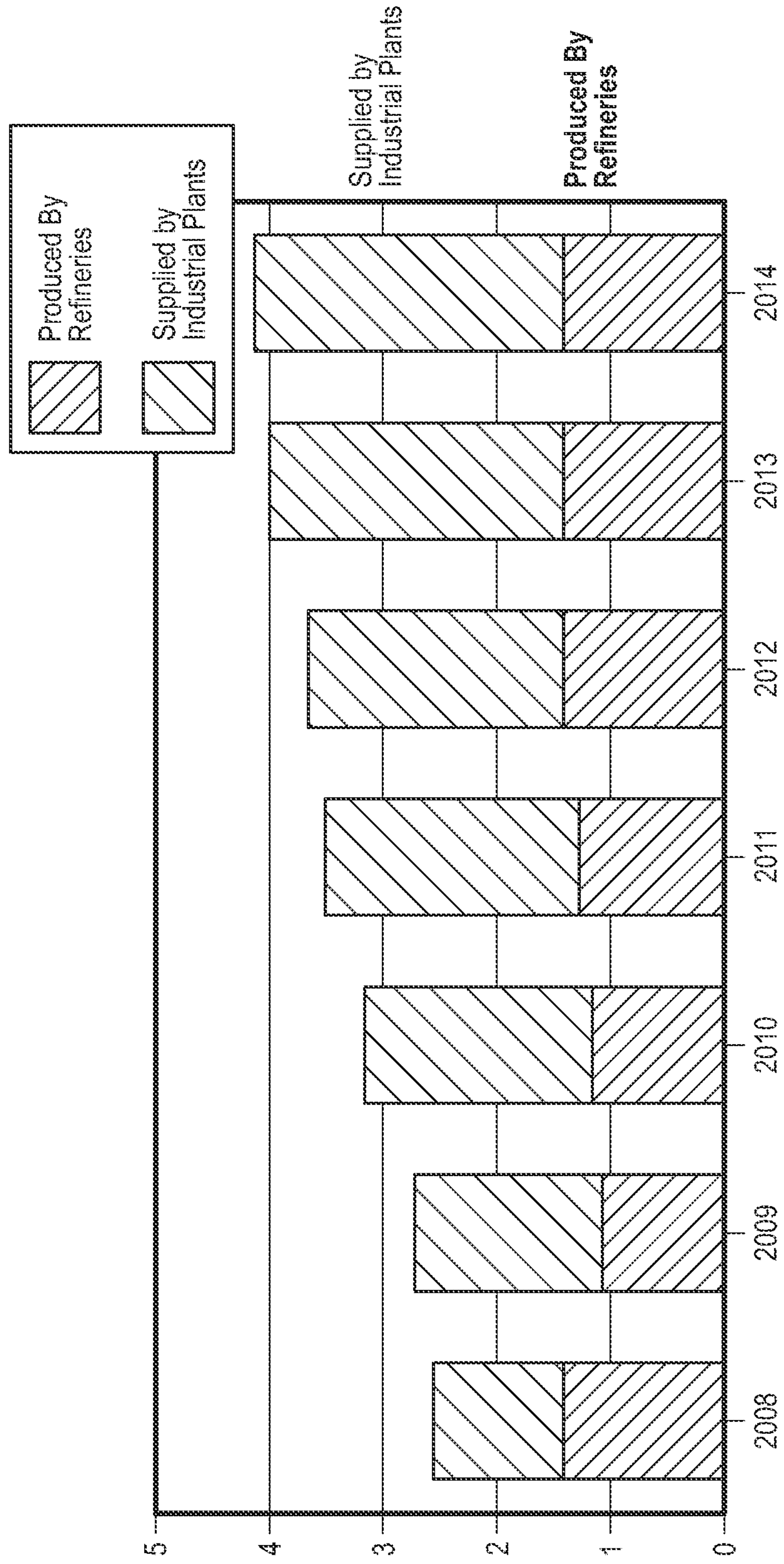
FIG. 13 (Prior Art)
FIG. 13 is a graph illustrating refinery demand for hydrogen in the United States from 2008-2014.
Figure 14A:
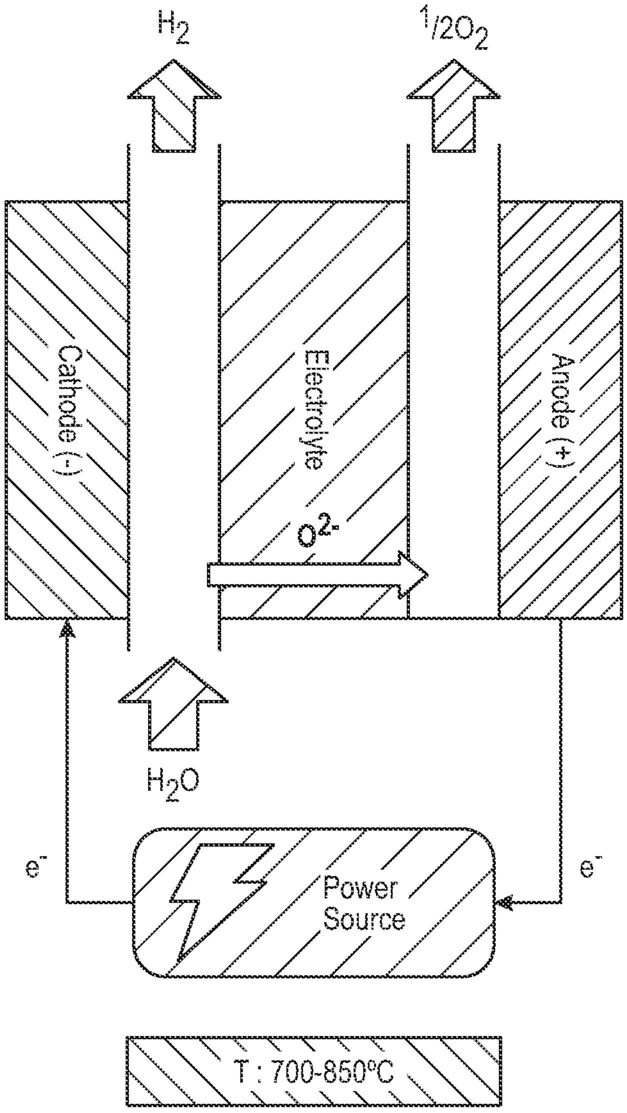
FIG. 14A (Prior Art)
FIG. 14A is a schematic diagram of a typical high temperature steam electrolysis (HTSE) fuel cell in which the inlet steam temperature is to be maintained between 700-850° C.
Figure 15A:
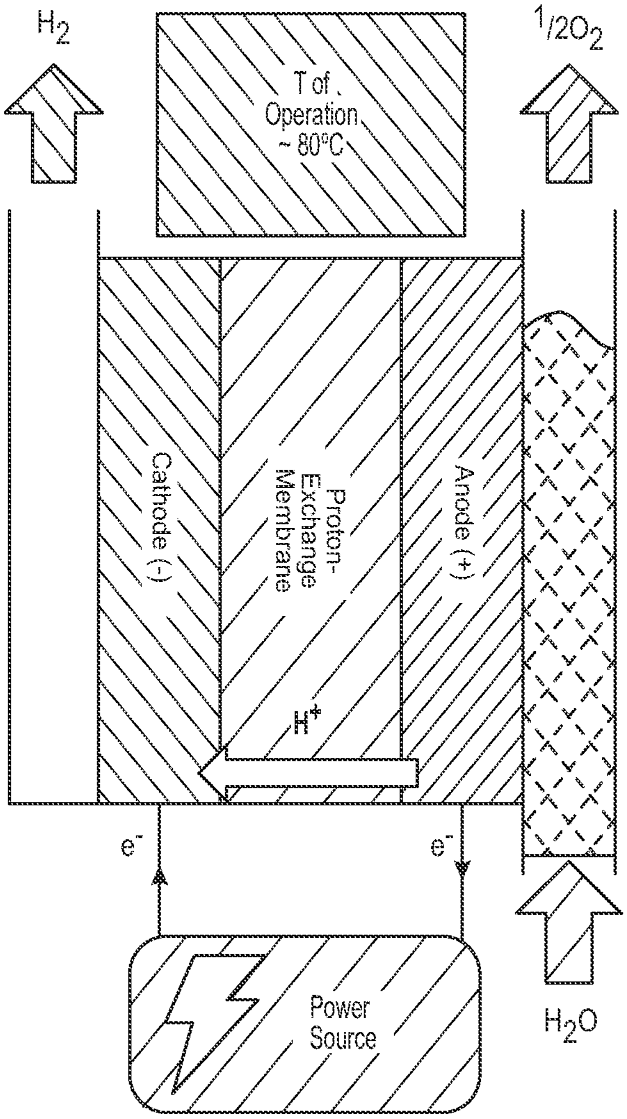
FIG. 15A (Prior Art)
FIG. 15A is a schematic diagram of a typical proton exchange membrane (PEM) electrolysis fuel cell in which the inlet water temperature can be room temperature.
Figure 16:
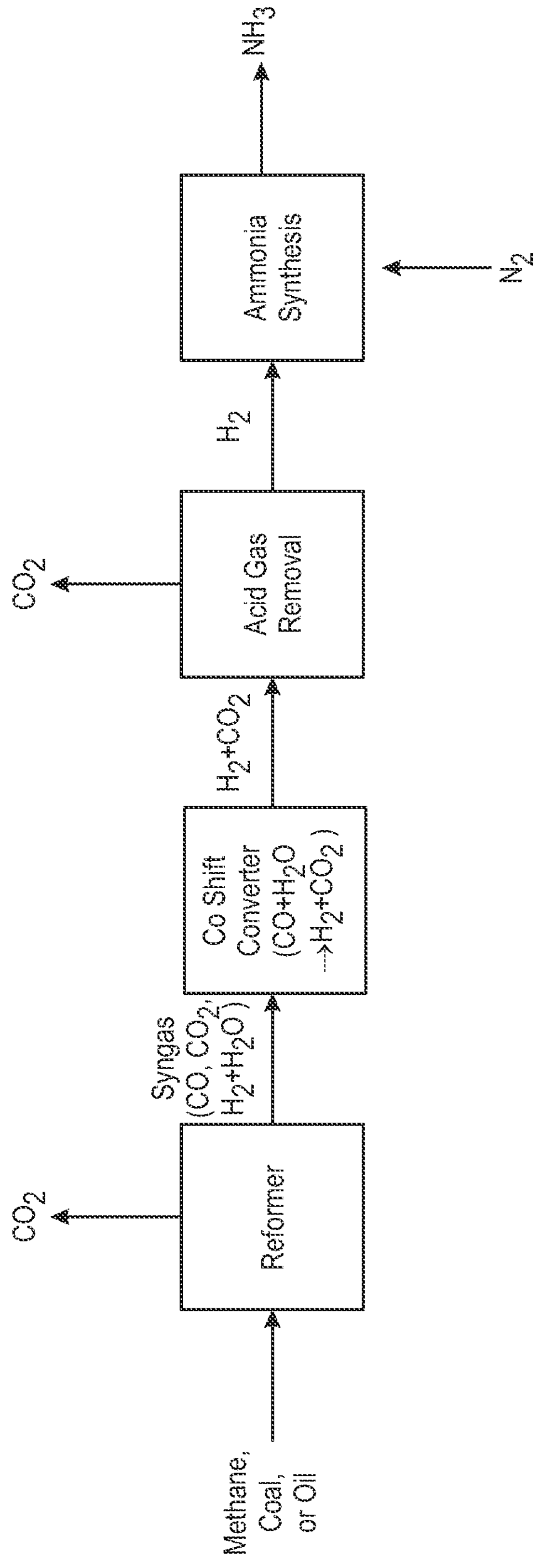
FIG. 16 (Prior Art)
FIG. 16 is a schematic diagram of a typical ammonia synthesis process.
Figure 17:
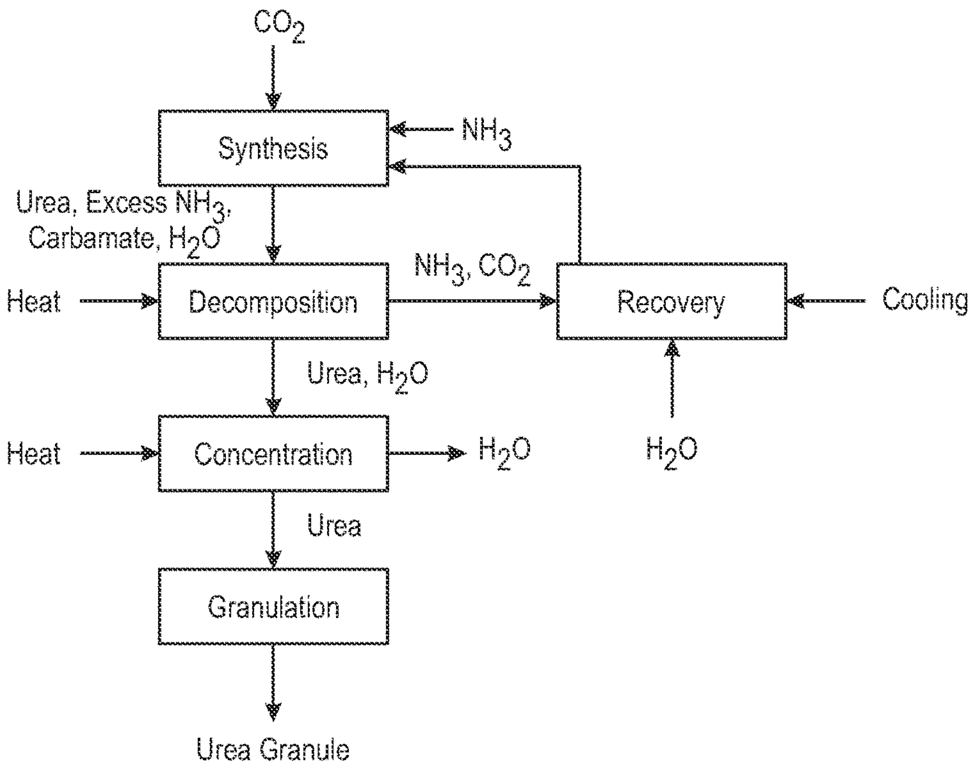
FIG. 17 (Prior Art)
FIG. 17 is a schematic diagram of a typical process for producing urea.
Figure 18:
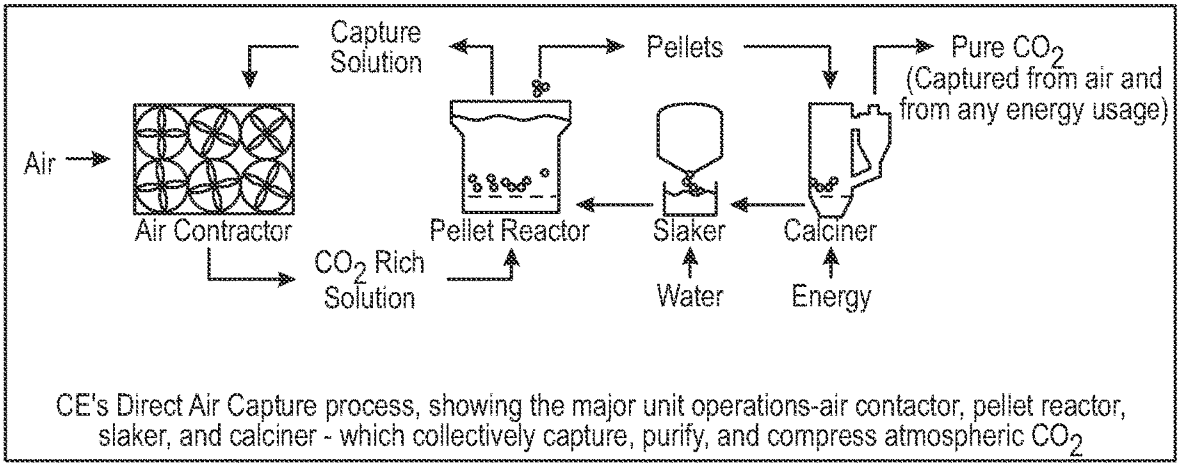
FIG. 18 (Prior Art)
FIG. 18 is a schematic diagram of a typical liquid sorbent process for capturing carbon dioxide from air.
Figure 19:
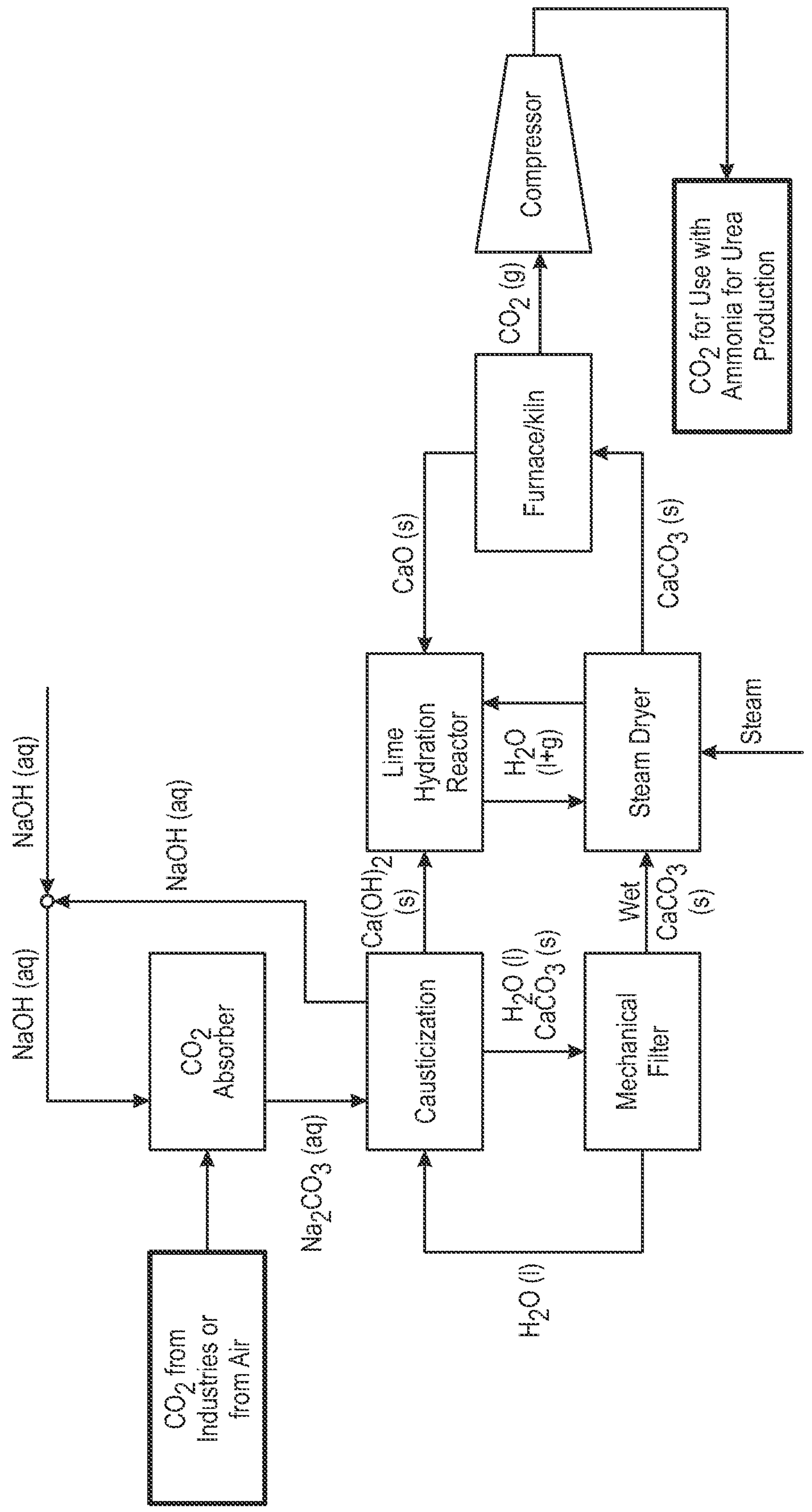
FIG. 19 (Prior Art)
FIG. 19 is a more detailed flow diagram of a typical liquid sorbent process for capturing carbon dioxide from air.
Figure 20:
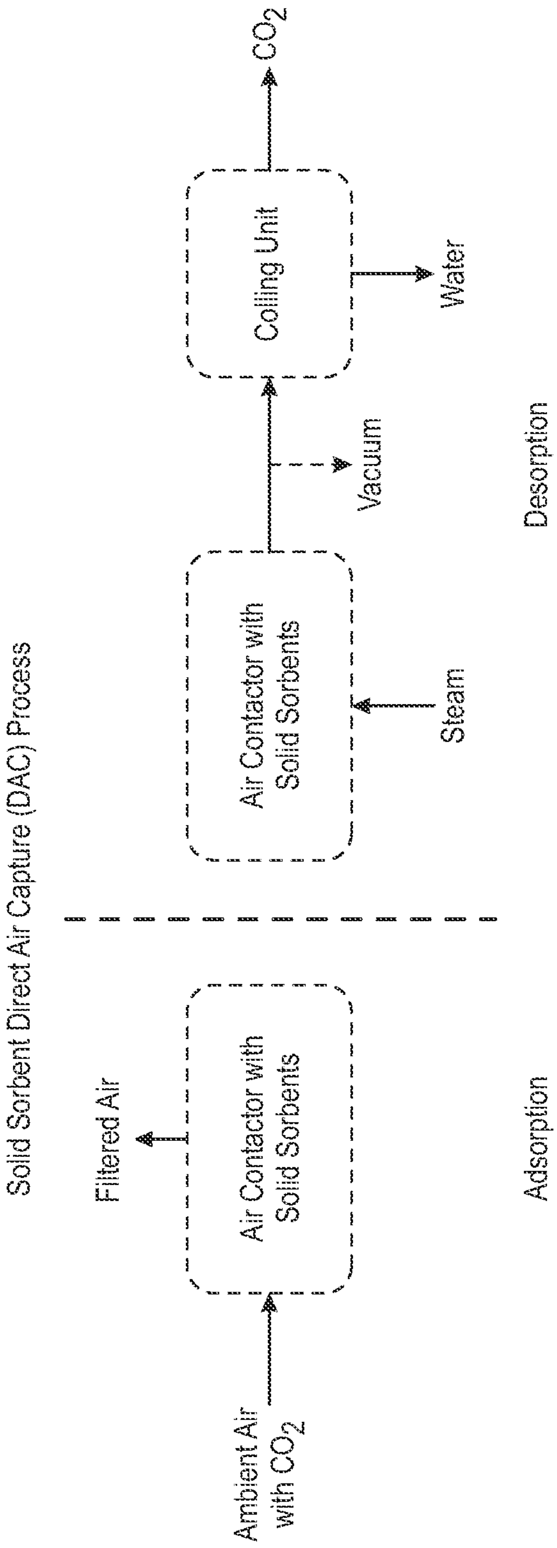
FIG. 20 (Prior Art)
FIG. 20 is a schematic diagram of a typical solid sorbent direct air capture (DAC) process.

Referring to FIGS. 4-8, in some embodiments any of the integrated energy systems 460, 560, 660, 760, and/or 860 can further be combined with one or more conventional processes for producing hydrogen, oxygen, carbon dioxide, steam, ammonia, urea, electricity, etc., such as a steam reforming process. For example, FIG. 9 is a schematic diagram of an integrated energy system 990 including any one of the integrated energy systems 460, 560, 660, 760, and/or 860 ("the integrated energy system 460-860") operably coupled to one or more steam reforming plants 984 in accordance with embodiments of the present technology.

In the illustrated embodiment, the integrated energy system 460-860 generates steam (e.g., high-quality steam) and electricity and routes the steam and electricity to the steam reforming plant 984. The integrated energy system 460-860 further produces "green" oxygen and "green" hydrogen as described in detail above with reference to FIGS. 4-8. The steam reforming plant 984 can receive natural gas (e.g., methane ($CH_4$)) and utilize the natural gas, steam, and electricity in a steam reforming process (e.g., a steam-methane reforming process) to produce "grey" hydrogen and carbon dioxide. The "grey" label indicates that the hydrogen is produced with a process that produces carbon emissions, while the "green" label indicates that the hydrogen is produced with a process (e.g., one or more of the electrolysis processes described in detail above) that produces few or zero carbon emissions.

The integrated energy system 960 can route the green oxygen, green hydrogen, grey hydrogen, and/or carbon dioxide to one or more chemical production plants 986 and/or one or more other industrial uses 988. The chemical production plant 986 can utilize one or more of the inputs to generate urea, ammonia, methanol, and/or other chemical products. The other industrial uses 988 can include oil refineries, other chemical production plants, steel refineries, hydrogen refilling stations, medical operations, hospitals, medical facilities, and/or the like.

In some embodiments, the integrated energy system 460-860 can further supply electricity to a direct air capture (DAC) plant 991. The DAC plant 991 can capture carbon dioxide produced by the steam reforming plant 984 and route the carbon dioxide to one or more carbon dioxide sequestration facilities 992 which can store the carbon dioxide. In some embodiments, the DAC plant 991 routes captured carbon dioxide to the chemical production plant 986 and/or the other industrial uses 988 for use therein.

In some aspects of the present technology, the integrated energy system 990 can have relatively fewer carbon emissions than energy systems that produce hydrogen and oxygen only from steam reforming. That is, the green oxygen and green hydrogen produced by the integrated energy system 460-860 can supplement hydrogen produced by the conventional steam reforming plant 984. Moreover, the integrated energy system 460-860 supplies carbon-free steam and electricity to run the steam reforming plant 984—further reducing overall emissions.

In additional aspects of the present technology, the integrated energy system 990 can provide redundant methods of producing hydrogen by utilizing electrolysis via the integrated energy system 460-860 and conventional steam reforming via the steam reforming plant 984. The outputs of the integrated energy system 460-860 can be flexibly/dynamically shifted based on the operational state of the electrolysis systems within the integrated energy system 460-860 and/or the steam reforming plant 984. For example, if the electrolysis systems of the integrated energy system 460-860 are undergoing maintenance, repair, etc., and/or are otherwise fully or partially inoperative, the integrated energy system 460-860 can route more steam and electricity to the steam reforming plant 984 by reconfiguring some or all of the nuclear reactors 300 of the power plant system 350 (FIG. 3) to increase the hydrogen output of the steam reforming plant 984. Similarly, if the steam reforming plant 984 is fully or partially inoperative, the integrated energy system 460-860 can utilize more steam and electricity to generate green oxygen and green hydrogen by reconfiguring some or all of the nuclear reactors 300 of the power plant system 350 (FIG. 3) to increase the hydrogen and oxygen output of the electrolysis systems.

Referring to FIGS. 4-9, each of the arrows indicating the routing/transfer of steam, electricity, high temperature steam, water, hydrogen, ammonia, urea, other chemical products, etc., can indicate a portion of the routing of overall production of each component. For example, referring to FIG. 5, the power plant system 350 can route a first portion of the electricity generated by the power plant system 350 to the water production plant 570, a second portion of the electricity to the auxiliary heater 571, a third portion of the electricity to the HTSE system 572, a fourth portion of the electricity to the LTSE system 573, a fifth portion of the electricity to the industrial process plant 564, and so on. Similarly, with continued reference to FIG. 5, the integrated energy system 560 can route a first portion of the hydrogen produced by the HTSE system 572 and/or the LTSE system 573 to the industrial process plant 564 and a second portion of the hydrogen to the hydrogen fuel cell 582.

Moreover, while reference is typically made herein to generating "steam," the power plant system 350 can be used to produce other gases. For example, other fluids can be fed into the nuclear reactors 300 (FIG. 3) and heated to produce gases other than steam that can be routed to various components of the integrated energy systems.

III. Additional Examples

The following examples are illustrative of several embodiments of the present technology:

1. An integrated energy system, comprising:
   - a power plant, wherein the power plant includes a plurality of nuclear reactors and an electrical power conversion system, wherein individual ones of the nuclear reactors are configured to heat a coolant into steam, and wherein the power plant is configured to route the steam from a first subset of the nuclear reactors to the electrical power conversion system to generate electricity;
   - a high temperature electrolysis system operably coupled to the power plant, wherein the high temperature electrolysis system is positioned to receive a first portion of the electricity from the power plant and a portion of the steam from a second subset of the nuclear reactors from the power plant, and wherein the high temperature electrolysis system is configured to utilize the first portion of the electricity and the portion of the steam in a high temperature electrolysis process to produce hydrogen and oxygen; and
   - a low temperature electrolysis system operably coupled to the power plant, wherein the low temperature electrolysis system is positioned to receive a second portion of the electricity from the power plant and water from a water source, and wherein the low temperature electrolysis system is configured to utilize the second portion of the electricity and the water in a low temperature electrolysis process to produce hydrogen and oxygen.

2. The integrated energy system of example 1, further comprising an auxiliary heater operably coupled to the power plant, wherein the auxiliary heater is positioned to receive the first portion of the steam from the power plant and a third portion of the electricity from the power plant, and wherein the auxiliary heater is configured to utilize the third portion of the electricity to super heat the first portion of the steam to above 700 degrees Celsius and route the superheated first portion of the steam to the high temperature electrolysis system for use in the high temperature electrolysis process.

3. The integrated energy system of example 1 or example 2, further comprising an industrial process plant, wherein the industrial process plant is positioned to receive the hydrogen from the high temperature electrolysis system and/or the low temperature electrolysis system, and wherein the industrial process plant is configured to utilize the hydrogen in an industrial process.

4. The integrated energy system of example 3 wherein the industrial process plant is positioned to receive a third portion of the electricity from the power plant, and wherein the industrial process plant is configured to utilize the third portion of the electricity in the industrial process.

5. The integrated energy system of example 3 or example 4 wherein the industrial process plant is local to the power plant.

6. The integrated energy system of any one of examples 3-5 wherein the industrial process plant is an oil refinery, and wherein the industrial process is an oil refinement process.

7. The integrated energy system of example 5 wherein the oil refinement process is a process for desulfurizing natural gas.

8. The integrated energy system of any one of examples 3-5 wherein the industrial process plant is an ammonia production plant, and wherein the industrial process is an ammonia production process to produce ammonia.

9. The integrated energy system of example 8, further comprising a nitrogen generator, wherein the nitrogen generator is positioned to receive a third portion of the electricity from the power plant and air, and wherein the nitrogen generator is configured to utilize the third portion of the electricity to process the air to capture nitrogen and route the captured nitrogen to the ammonia production plant for use in the ammonia production process.

10. The integrated energy system of example 9, further comprising a urea production plant, wherein the urea production plant is positioned to receive (a) a fourth portion of the electricity from the power plant, (b) a portion of the ammonia from the ammonia production plant, and (c) carbon dioxide from a carbon dioxide source, and wherein the urea production plant is configured to utilize the fourth portion of the electricity, the portion of the ammonia, and the carbon dioxide in a urea production process to produce urea.

11. The integrated energy system of example 10 wherein the carbon dioxide source is a direct air capture source, wherein the direct air capture source is positioned to receive a fifth portion of the electricity from the power plant and air, and wherein the direct air capture source is configured to utilize the fifth portion of the electricity to process the air to capture the carbon dioxide and route the captured carbon dioxide to the urea production plant for use in the urea production process.

12. The integrated energy system of any one of examples 1-11 wherein—
   - during a first operational state of the high temperature electrolysis system and the low temperature electrolysis system, the first subset of the nuclear reactors comprises a first number of the nuclear reactors and the second subset of the nuclear reactors comprises a second number of the nuclear reactors; and
   - during a second operational state of the high temperature electrolysis system and the low temperature electrolysis system, the first subset of the nuclear reactors comprises a third number of the nuclear reactors, different than the first number, and the second subset of the nuclear reactors comprises a fourth number of the nuclear reactors, different than the second number.

13. The integrated energy system of any one of examples 1-12, further comprising the water source, wherein the water source is positioned to receive a third portion of the electricity from the power plant and the water, and wherein the water source is configured to utilize the third portion of the electricity to process the water to produce high-quality water and route the high-quality water to the low temperature electrolysis system.

14. The integrated energy system of example 13 wherein the water source is a water treatment plant or a water desalination plant.

15. An integrated energy system, comprising:

a power plant, wherein the power plant includes a plurality of nuclear reactors and an electrical power conversion system, wherein individual ones of the nuclear reactors are configured to heat a coolant into steam, and wherein the power plant is configured to route the steam from a first subset of the nuclear reactors to the electrical power conversion system to generate electricity;

a hydrogen production plant operably coupled to the power plant, wherein the hydrogen production plant is positioned to receive a first portion of the electricity, and wherein the hydrogen production plant is configured to utilize the first portion of the electricity in an electrolysis process to produce hydrogen; and an oil refinery plant operably coupled to the power plant, wherein the oil refinery plant is positioned to receive (a) a portion the hydrogen from the hydrogen production plant, (b) a second portion of the electricity from the power plant, and (c) a portion of the steam from a second subset of the nuclear reactors from the power plant, and wherein the oil refinery plant is configured to utilize the portion of the hydrogen, the second portion of the electricity, and the portion of the steam in an oil refinement process.

16. The integrated energy system of example 15 wherein the oil refinement process is a process for desulfurizing natural gas.

17 The integrated energy system of example 15 or example 16 wherein the power plant is local to the hydrogen production plant and the oil refinery plant.

18. An integrated energy system, comprising:

a power plant, wherein the power plant includes a plurality of nuclear reactors and an electrical power conversion system, wherein individual ones of the nuclear reactors are configured to heat a coolant into steam, and wherein the power plant is configured to route the steam from a subset of the nuclear reactors to the electrical power conversion system to generate electricity;

a hydrogen production plant operably coupled to the power plant, wherein the hydrogen production plant is positioned to receive a first portion of the electricity, and wherein the hydrogen production plant is configured to utilize the first portion of the electricity in an electrolysis process to produce hydrogen;

a nitrogen generator operably coupled to the power plant, wherein the nitrogen generator is positioned to receive a second portion of the electricity from the power plant and air, and wherein the nitrogen generator is configured to utilize the second portion of the electricity to process the air to capture nitrogen; and an ammonia production plant operably coupled to the power plant, wherein the ammonia production plant is positioned to receive (a) a third portion of the electricity from the power plant, (b) a portion of the hydrogen from the hydrogen production plant, and (c) a portion of the nitrogen from the nitrogen generator, and wherein the ammonia production plant is configured to utilize the third portion of the electricity, the portion of the hydrogen, and the portion of the nitrogen in an ammonia production process to produce ammonia.

19. The integrated energy system of example 18 wherein the power plant is local to the hydrogen production plant, the nitrogen generator, and the ammonia production plant.

20 The integrated energy system of example 18 or example 19, further comprising a urea production plant operably coupled to the power plant system, wherein the urea production plant is positioned to receive (a) a fourth portion of the electricity from the power plant, (b) a portion of the ammonia from the ammonia production plant, and (c) carbon dioxide from a carbon dioxide source, and wherein the urea production plant is configured to utilize the fourth portion of the electricity, the portion of the ammonia, and the carbon dioxide in a urea production process to produce urea.

IV. CONCLUSION

All numeric values are herein assumed to be modified by the term about whether or not explicitly indicated. The term about, in the context of numeric values, generally refers to a range of numbers that one of skill in the art would consider equivalent to the recited value (e.g., having the same function and/or result). For example, the term about can refer to the stated value plus or minus ten percent. For example, the use of the term about 100 can refer to a range of from 90 to 110, inclusive. In instances in which the context requires otherwise and/or relative terminology is used in reference to something that does not include, or is not related to, a numerical value, the terms are given their ordinary meaning to one skilled in the art.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology, as those skilled in the relevant art will recognize. For example, although steps may be presented in a given order, in other embodiments, the steps may be performed in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase and/or as in A and/or B refers to A alone, B alone, and A and B. Additionally, the term comprising is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An integrated energy system, comprising:

a power plant, wherein the power plant includes a plurality of nuclear reactors and an electrical power conversion system, wherein individual ones of the nuclear reactors are configured to heat a coolant into steam, and wherein the power plant is configured to route the steam from a first subset of the nuclear reactors to the electrical power conversion system to generate electricity;

a high temperature electrolysis system operably coupled to the power plant, wherein the high temperature electrolysis system is positioned to receive a first portion of the electricity from the power plant and a portion of the steam from a second subset of the nuclear reactors from the power plant, and wherein the high temperature electrolysis system is configured to utilize the first portion of the electricity and the portion of the steam in a high temperature electrolysis process to produce hydrogen and oxygen; and a low temperature electrolysis system operably coupled to the power plant, wherein the low temperature electrolysis system is positioned to receive a second portion of the electricity from the power plant and water from a water source, and wherein the low temperature electrolysis system is configured to utilize the second portion of the electricity and the water in a low temperature electrolysis process to produce hydrogen and oxygen.

2. The integrated energy system of claim 1, further comprising an auxiliary heater operably coupled to the power plant, wherein the auxiliary heater is positioned to receive the first portion of the steam from the power plant and a third portion of the electricity from the power plant, and wherein the auxiliary heater is configured to utilize the third portion of the electricity to super heat the first portion of the steam to above 700 degrees Celsius and route the superheated first portion of the steam to the high temperature electrolysis system for use in the high temperature electrolysis process.

3. The integrated energy system of claim 1, further comprising an industrial process plant, wherein the industrial process plant is positioned to receive the hydrogen from the high temperature electrolysis system and/or the low temperature electrolysis system, and wherein the industrial process plant is configured to utilize the hydrogen in an industrial process.

4. The integrated energy system of claim 3, wherein the industrial process plant is positioned to receive a third portion of the electricity from the power plant, and wherein the industrial process plant is configured to utilize the third portion of the electricity in the industrial process.

5. The integrated energy system of claim 3, wherein the industrial process plant is local to the power plant.

6. The integrated energy system of claim 3, wherein the industrial process plant is an oil refinery, and wherein the industrial process is an oil refinement process.

7. The integrated energy system of claim 6, wherein the oil refinement process is a process for desulfurizing natural gas.

8. The integrated energy system of claim 3, wherein the industrial process plant is an ammonia production plant, and wherein the industrial process is an ammonia production process to produce ammonia.

9. The integrated energy system of claim 8, further comprising a nitrogen generator, wherein the nitrogen generator is positioned to receive a third portion of the electricity from the power plant and air, and wherein the nitrogen generator is configured to utilize the third portion of the electricity to process the air to capture nitrogen and route the captured nitrogen to the ammonia production plant for use in the ammonia production process.

10. The integrated energy system of claim 9, further comprising a urea production plant, wherein the urea production plant is positioned to receive (a) a fourth portion of the electricity from the power plant, (b) a portion of the ammonia from the ammonia production plant, and (c) carbon dioxide from a carbon dioxide source, and wherein the urea production plant is configured to utilize the fourth portion of the electricity, the portion of the ammonia, and the carbon dioxide in a urea production process to produce urea.

11. The integrated energy system of claim 10, wherein the carbon dioxide source is a direct air capture source, wherein the direct air capture source is positioned to receive a fifth portion of the electricity from the power plant and air, and wherein the direct air capture source is configured to utilize the fifth portion of the electricity to process the air to capture the carbon dioxide and route the captured carbon dioxide to the urea production plant for use in the urea production process.

12. The integrated energy system of claim 1, wherein during a first operational state of the high temperature electrolysis system and the low temperature electrolysis system, the first subset of the nuclear reactors comprises a first number of the nuclear reactors and the second subset of the nuclear reactors comprises a second number of the nuclear reactors; and during a second operational state of the high temperature electrolysis system and the low temperature electrolysis system, the first subset of the nuclear reactors comprises a third number of the nuclear reactors, different than the first number, and the second subset of the nuclear reactors comprises a fourth number of the nuclear reactors, different than the second number.

13. The integrated energy system of claim 1, further comprising the water source, wherein the water source is positioned to receive a third portion of the electricity from the power plant and the water, and wherein the water source is configured to utilize the third portion of the electricity to process the water to produce high-quality water and route the high-quality water to the low temperature electrolysis system.

14. The integrated energy system of claim 13, wherein the water source is a water treatment plant or a water desalination plant.

15. A method of operating an integrated energy system, comprising:

operating a power plant that includes a plurality of nuclear reactors coupled to an electrical power conversion system by:

operating the plurality of nuclear reactors to heat a coolant into steam; and routing a first portion of the steam from a first subset of the plurality of nuclear reactors to the electrical power conversion system to generate electricity;

operating a high temperature electrolysis system coupled to the power plant by:

receiving, at the high temperature electrolysis system, a first portion of the electricity from the power plant and a second portion of the steam from a second subset of the plurality of nuclear reactors; and utilizing the first portion of the electricity and the second portion of the steam in a high temperature electrolysis process to produce hydrogen and oxygen; and operating a low temperature electrolysis system coupled to the power plant by:

receiving, at the low temperature electrolysis system, a second portion of the electricity from the power plant and water from a water source; and utilizing the second portion of the electricity and the water in a low temperature electrolysis process to produce hydrogen and oxygen.

16. The method of claim 15, further comprising:

operating an auxiliary heater operably coupled to the power plant by:

receiving, at the auxiliary heater, the first portion of the steam from the power plant and a third portion of the electricity from the power plant, and utilizing the third portion of the electricity to super heat the first portion of the steam to above 700 degrees Celsius and route the superheated first portion of the steam to the high temperature electrolysis system for use in the high temperature electrolysis process.

17. The method of claim 15, further comprising operating an industrial process plant coupled to the power plant by:

receiving, at the industrial process plant, the hydrogen from the high temperature electrolysis system and/or the low temperature electrolysis system, and utilizing the hydrogen in an industrial process.

18. The method of claim 17, further comprising:

receiving, at the industrial process plant, a third portion of the electricity from the power plant, and utilizing the third portion of the electricity in the industrial process.

19. The method of claim 15 wherein, during a first operational state of the high temperature electrolysis system and the low temperature electrolysis system, the first subset of the nuclear reactors comprises a first number of the nuclear reactors and the second subset of the nuclear reactors comprises a second number of the nuclear reactors; and during a second operational state of the high temperature electrolysis system and the low temperature electrolysis system, the first subset of the nuclear reactors comprises a third number of the nuclear reactors, different than the first number, and the second subset of the nuclear reactors comprises a fourth number of the nuclear reactors, different than the second number.

20. The method of claim 15, further comprising operating the water source by:

receiving, at the water source, a third portion of the electricity from the power plant and the water, and utilizing the third portion of the electricity to process the water to produce high-quality water and route the high-quality water to the low temperature electrolysis system.

* * * * *